United States Patent
Zhou et al.

(10) Patent No.: US 12,425,613 B2
(45) Date of Patent: Sep. 23, 2025

(54) IMAGE DECODING APPARATUS AND IMAGE CODING APPARATUS

(71) Applicant: Sharp Kabushiki Kaisha, Sakai (JP)

(72) Inventors: Tianyang Zhou, Sakai (JP); Tomohiro Ikai, Sakai (JP); Eiichi Sasaki, Sakai (JP); Tomoko Aono, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 146 days.

(21) Appl. No.: 18/267,794

(22) PCT Filed: Dec. 14, 2021

(86) PCT No.: PCT/JP2021/045993
§ 371 (c)(1),
(2) Date: Jun. 16, 2023

(87) PCT Pub. No.: WO2022/131243
PCT Pub. Date: Jun. 23, 2022

(65) Prior Publication Data
US 2024/0107033 A1 Mar. 28, 2024

(30) Foreign Application Priority Data
Dec. 18, 2020 (JP) .................. 2020-209914

(51) Int. Cl.
*H04N 19/18* (2014.01)
*H04N 19/124* (2014.01)
(Continued)

(52) U.S. Cl.
CPC .......... *H04N 19/18* (2014.11); *H04N 19/124* (2014.11); *H04N 19/184* (2014.11); *H04N 19/30* (2014.11); *H04N 19/60* (2014.11); *H04N 19/70* (2014.11)

(58) Field of Classification Search
CPC .... H04N 19/18; H04N 19/124; H04N 19/184; H04N 19/30; H04N 19/60; H04N 19/70
See application file for complete search history.

(56) References Cited

U.S. PATENT DOCUMENTS

| | | | | |
|---|---|---|---|---|
| 2015/0016542 A1* | 1/2015 | Rosewarne | .......... | H04N 19/126 375/240.25 |
| 2015/0131721 A1* | 5/2015 | Yu | ........................ | H04N 19/139 375/240.12 |

(Continued)

FOREIGN PATENT DOCUMENTS

GB 2521685 A * 7/2015 ............. H04N 19/13

OTHER PUBLICATIONS

ITU-T Series H: Audiovisual and Multimedia Systems Infrastructure of audiovisual services—Coding of moving video H.265, Nov. 2019 Note: document identified in IDS dated Jun. 16, 2023. (Year: 2019).*

(Continued)

*Primary Examiner* — Richard A Hansell, Jr.
(74) *Attorney, Agent, or Firm* — Keating & Bennett, LLP

(57) ABSTRACT

Provided are an image decoding apparatus (31) and an image coding apparatus (11) in which both transform precision and residual coding efficiency are preferable. Included are a TU decoder (3024) configured to decode, from coded data, a syntax element representing an absolute value of a transform coefficient, a scaling unit (311) configured to multiply a transform coefficient by a quantization-parameter dependent value and perform right-shift by a first shift value, and to perform clipping using a minimum value and a maximum value according to a first range, and an inverse conversion processing unit (311) configured to convert a scaled transform coefficient, perform clipping using the minimum value and the maximum value according to the first range to derive an intermediate coefficient, further transform an intermediate variable, and perform right-shift by a second shift value. The scaling unit (311) derives the first range, the first shift value, and the second shift value in accordance with a value of a first bit-depth, and limits the first range to be equal to or less than a prescribed value.

5 Claims, 28 Drawing Sheets

(51) Int. Cl.
  *H04N 19/184* (2014.01)
  *H04N 19/30* (2014.01)
  *H04N 19/60* (2014.01)
  *H04N 19/70* (2014.01)

(56) References Cited

U.S. PATENT DOCUMENTS

| | | | |
|---|---|---|---|
| 2017/0155903 A1* | 6/2017 | Rosewarne | H04N 19/13 |
| 2022/0046247 A1* | 2/2022 | Yoo | H04N 19/196 |
| 2022/0210476 A1* | 6/2022 | Choi | H04N 19/132 |
| 2022/0264118 A1* | 8/2022 | Choi | H04N 19/12 |
| 2022/0377345 A1* | 11/2022 | Choi | H04N 19/13 |
| 2024/0048733 A1* | 2/2024 | Zhao | H04N 19/184 |
| 2025/0071307 A1* | 2/2025 | Tsukuba | H04N 19/91 |

OTHER PUBLICATIONS

International Telecommunication Union, "Series H: Audiovisual and Multimedia Systems Infrastructure of audiovisual services—Coding of moving video, High efficiency video coding", ITU-T H.265, Nov. 2019, 711 pages.

Bross et al., "Versatile Video Coding Editorial Refinements on Draft 10", Joint Video Experts Team (JVET) of ITU-T SG 16 WP 3 and ISO/IEC JTC 1/SC 29, JVET-T2001-v1, Oct. 7-16, 2020, 512 pages.

\* cited by examiner (a)
| seq_parameter_set_rbsp( ) { | Descriptor |
|---|---|
| sps_seq_parameter_set_id | u(4) |
| sps_video_parameter_set_id | u(4) |
| ... | ... |
| sps_transform_skip_enabled_flag | u(1) |
| if( sps_transform_skip_enabled_flag ) { | |
| sps_log2_transform_skip_max_size_minus2 | ue(v) |
| sps_bdpcm_enabled_flag | u(1) |
| } | |
| ... | ... |
| if( sps_transform_skip_enabled_flag  \|\|  sps_palette_enabled_flag ) | |
| sps_min_qp_prime_ts | ue(v) |
| ... | ... |
| sps_dep_quant_enabled_flag | u(1) |
| sps_sign_data_hiding_enabled_flag | u(1) |
| ... | ... |
| } | |

(b)
| slice_header( ) { | Descriptor |
|---|---|
| ... | ... |
| if( sps_dep_quant_enabled_flag ) | |
| sh_dep_quant_used_flag | u(1) |
| if( sps_sign_data_hiding_enabled_flag  &&  !sh_dep_quant_used_flag ) | |
| sh_sign_data_hiding_used_flag | u(1) |
| if( sps_transform_skip_enabled_flag  &&  !sh_dep_quant_used_flag  &&<br>!sh_sign_data_hiding_used_flag ) | |
| sh_ts_residual_coding_disabled_flag | u(1) |
| ... | ... |
| } | |

| coding_unit( x0, y0, cbWidth, cbHeight, cqtDepth, treeType, modeType ) { | Descriptor |
|---|---|
| ... | |
| if( sps_bdpcm_enabled_flag && cbWidth <= MaxTsSize && cbHeight <= MaxTsSize ) | |
|     intra_bdpcm_luma_flag | ae(v) |
| if( intra_bdpcm_luma_flag ) | |
|     intra_bdpcm_luma_dir_flag | ae(v) |
| else { | |
|     ... | ae(v) |
|     if( cbWidth/SubWidthC <= MaxTsSize && cbHeight/SubHeightC <= MaxTsSize<br>      && sps_bdpcm_enabled_flag ) | |
|     intra_bdpcm_chroma_flag | ae(v) |
|     if( intra_bdpcm_chroma_flag ) | |
|       intra_bdpcm_chroma_dir_flag | ae(v) |
|     else { | |
|       ... | |
| } | |

(b)

| transform_unit( x0, y0, tbWidth, tbHeight, treeType, subTuIndex, chType ) { | Descriptor |
|---|---|
| ... | ... |
| if( tu_y_coded_flag[ x0 ][ y0 ] && treeType != DUAL_TREE_CHROMA ) { | |
|   if( sps_transform_skip_enabled_flag && !BdpcmFlag[ x0 ][ y0 ][ 0 ] &&<br>    tbWidth <= MaxTsSize && tbHeight <= MaxTsSize && (<br>    IntraSubPartitionsSplitType == ISP_NO_SPLIT ) && !cu_sbt_flag ) | |
|     transform_skip_flag[ x0 ][ y0 ][ 0 ] | ae(v) |
|   if( !transform_skip_flag[x0][y0][0] \|\| sh_ts_residual_coding_disabled_flag ) | |
|     residual_coding( x0, y0, Log2( tbWidth ), Log2( tbHeight ), 0 ) | |
|   else | |
|     residual_ts_coding( x0, y0, Log2( tbWidth ), Log2( tbHeight ), 0 ) | |
| } | |
| ... | ... |
| } | |

| residual_coding( x0, y0, log2TbWidth, log2TbHeight, cIdx ) { | Descriptor |
|---|---|
| ... | |
|   for( i = lastSubBlock; i >= 0; i- - ) { | |
|     startQStateSb = QState | |
|     xS = DiagScanOrder[ log2TbWidth − log2SbW ][ log2TbHeight − log2SbH ][ i ][ 0 ] | |
|     yS = DiagScanOrder[ log2TbWidth − log2SbW ][ log2TbHeight − log2SbH ][ i ][ 1 ] | |
|     inferSbDcSigCoeffFlag = 0 | |
|     if( i < lastSubBlock && i > 0 ) { | |
|       sb_coded_flag[ xS ][ yS ] | |
|       inferSbDcSigCoeffFlag = 1 | ae(v) |
|     } | |
|     ... | |
|     firstSigScanPosSb = numSbCoeff | |
|     lastSigScanPosSb = −1 | |
|     ... | |
|     for( n = firstPosMode0; n >= 0 && remBinsPass1 >= 4; n- - ) { | |
|       xC = ( xS << log2SbW ) + DiagScanOrder[ log2SbW ][ log2SbH ][ n ][ 0 ] | |
|       yC = ( yS << log2SbH ) + DiagScanOrder[ log2SbW ][ log2SbH ][ n ][ 1 ] | |
|       if(sb_coded_flag[ xS ][ yS ] && ( n > 0 \|\| !inferSbDcSigCoeffFlag ) && <br>         ( xC != LastSignificantCoeffX \|\| yC != LastSignificantCoeffY ) ) { | |
|         sig_coeff_flag[ xC ][ yC ] | ae(v) |
|         ... | |
|       } | |
|       if( sig_coeff_flag[ xC ][ yC ] ) { | |
|         abs_level_gtx_flag[ n ][ 0 ] | ae(v) |
|         ... | |
|         if( abs_level_gtx_flag[ n ][ 0 ] ) { | |
|           par_level_flag[ n ] | ae(v) |
|           ... | |
|           abs_level_gtx_flag[ n ][ 1 ] | ae(v) |
|           ... | ... |
|         } | |
|       if( lastSigScanPosSb = = −1 ) | |
|         lastSigScanPosSb = n | |
|       firstSigScanPosSb = n | |
|     } | |

FIG. 11

| (b) | AbsLevelPass1[ xC ][ yC ] = sig_coeff_flag[ xC ][ yC ] + par_level_flag[ n ] + abs_level_gtx_flag[ n ][ 0 ] + 2 * abs_level_gtx_flag[ n ][ 1 ] | |
|---|---|---|
| | if( sh_dep_quant_used_flag ) | |
| | QState = QStateTransTable[ QState ][ AbsLevelPass1[ xC ][ yC ] & 1 ] | |
| | firstPosMode1 = n − 1 | |
| | } | |
| | for( n = firstPosMode0; n > firstPosMode1; n− − ) { | |
| | xC = ( xS << log2SbW ) + DiagScanOrder[ log2SbW ][ log2SbH ][ n ][ 0 ] | |
| | yC = ( yS << log2SbH ) + DiagScanOrder[ log2SbW ][ log2SbH ][ n ][ 1 ] | |
| | if( abs_level_gtx_flag[ n ][ 1 ] ) | |
| | abs_remainder[ n ] | ae(v) |
| | AbsLevel[ xC ][ yC ] = AbsLevelPass1[ xC ][ yC ] + 2 * abs_remainder[ n ] | |
| | } | |
| | for( n = firstPosMode1; n >= 0; n− − ) { | |
| | xC = ( xS << log2SbW ) + DiagScanOrder[ log2SbW ][ log2SbH ][ n ][ 0 ] | |
| | yC = ( yS << log2SbH ) + DiagScanOrder[ log2SbW ][ log2SbH ][ n ][ 1 ] | |
| | if( sb_coded_flag[ xS ][ yS ] ) | |
| | dec_abs_level[ n ] | ae(v) |
| | if( AbsLevel[ xC ][ yC ] > 0 ) { | |
| | if( lastSigScanPosSb == −1 ) | |
| | lastSigScanPosSb = n | |
| | firstSigScanPosSb = n | |
| | } | |
| | if( sh_dep_quant_used_flag ) | |
| | QState = QStateTransTable[ QState ][ AbsLevel[ xC ][ yC ] & 1 ] | |
| | } | |
| | signHiddenFlag = sh_sign_data_hiding_used_flag && ( lastSigScanPosSb − firstSigScanPosSb > 3 ? 1 : 0 ) | |
| | for( n = numSbCoeff − 1; n >= 0; n− − ) { | |
| | xC = ( xS << log2SbW ) + DiagScanOrder[ log2SbW ][ log2SbH ][ n ][ 0 ] | |
| | yC = ( yS << log2SbH ) + DiagScanOrder[ log2SbW ][ log2SbH ][ n ][ 1 ] | |
| | if( ( AbsLevel[ xC ][ yC ] > 0 ) && ( !signHiddenFlag \|\| ( n != firstSigScanPosSb ) ) ) | |
| | coeff_sign_flag[ n ] | ae(v) |
| | } | |

FIG. 12

```
(c)   if( sh_dep_quant_used_flag ) {
          QState = startQStateSb
          for( n = numSbCoeff − 1; n >= 0; n− − ) {
              xC = ( xS << log2SbW ) + DiagScanOrder[ log2SbW ][ log2SbH ][ n ][ 0 ]
              yC = ( yS << log2SbH ) + DiagScanOrder[ log2SbW ][ log2SbH ][ n ][ 1 ]
              if( AbsLevel[ xC ][ yC ] > 0 )                                            ← SYN1101
                  TransCoeffLevel[ x0 ][ y0 ][ cIdx ][ xC ][ yC ] =
                      ( 2 * AbsLevel[ xC ][ yC ] − ( QState > 1 ? 1 : 0 ) ) *
                      ( 1 − 2 * coeff_sign_flag[ n ] )
              QState = QStateTransTable[ QState ][ AbsLevel[ xC ][ yC ] & 1 ]
          }
      } else {
          sumAbsLevel = 0
          for( n = numSbCoeff − 1; n >= 0; n− − ) {
              xC = ( xS << log2SbW ) + DiagScanOrder[ log2SbW ][ log2SbH ][ n ][ 0 ]
              yC = ( yS << log2SbH ) + DiagScanOrder[ log2SbW ][ log2SbH ][ n ][ 1 ]
              if( AbsLevel[ xC ][ yC ] > 0 ) {
                  TransCoeffLevel[ x0 ][ y0 ][ cIdx ][ xC ][ yC ] =                     ← SYN1102
                      AbsLevel[ xC ][ yC ] * ( 1 − 2 * coeff_sign_flag[ n ] )
                  if( signHiddenFlag ) {
                      sumAbsLevel += AbsLevel[ xC ][ yC ]
                      if( n == firstSigScanPosSb && sumAbsLevel % 2 == 1 )
                          TransCoeffLevel[ x0 ][ y0 ][ cIdx ][ xC ][ yC ] =
                              −TransCoeffLevel[ x0 ][ y0 ][ cIdx ][ xC ][ yC ]
                  }
              }
          }
      }
  }
}
```

FIG. 13

| (a) | residual_ts_coding( x0, y0, log2TbWidth, log2TbHeight, cIdx ) { | Descriptor |
|---|---|---|
| | ... | ... |
| | for( i =0; i <= lastSubBlock; i++ ) { | |
| |   xS = DiagScanOrder[ log2TbWidth - log2SbW ][ log2TbHeight - log2SbH ][ i ][ 0 ] | |
| |   yS = DiagScanOrder[ log2TbWidth - log2SbW ][ log2TbHeight - log2SbH ][ i ][ 1 ] | |
| |   if( i != lastSubBlock || !inferSbCbf ) | |
| |     coded_sub_block_flag[ xS ][ yS ] | ae(v) |
| | ... | ... |
| | /* First scan pass */ | |
| | ... | ... |
| | lastScanPosPass1 = -1 | |
| | for( n = 0; n <= numSbCoeff - 1 && RemCcbs >= 4; n++ ) { | |
| |   xC = ( xS << log2SbW ) + DiagScanOrder[ log2SbW ][ log2SbH ][ n ][ 0 ] | |
| |   yC = ( yS << log2SbH ) + DiagScanOrder[ log2SbW ][ log2SbH ][ n ][ 1 ] | |
| |   lastScanPosPass1 = n | |
| |   if(sb_coded_flag[xS][yS] && (n!=numSbCoeff-1 || !inferSbSigCoeffFlag)) { | |
| |     sig_coeff_flag[ xC ][ yC ] | ae(v) |
| |     ... | ... |
| |   } | |
| |   if( sig_coeff_flag[ xC ][ yC ] { | |
| |     coeff_sign_flag[ n ] | ae(v) |
| |     ... | ... |
| |     abs_level_gtx_flag[ n ][ 0 ] | ae(v) |
| |     ... | ... |
| |     if( abs_level_gtx_flag[ n ][ 0 ] ) { | |
| |       par_level_flag[ n ] | ae(v) |
| |       ... | ... |
| |     } | |
| |   } | |
| |   AbsLevelPass1[ xC ][ yC ] = | |
| |     sig_coeff_flag[xC][yC] + par_level_flag[n] + abs_level_gtx_flag[n][0] | |
| | } | |
| | /* Greater than X scan pass (numGtXFlags=5) */ | |
| | lastScanPosPass2 = -1 | |
| | for( n = 0; n <= numSbCoeff - 1 && RemCcbs >= 4; n++ ) { | |
| |   xC = ( xS << log2SbW ) + DiagScanOrder[ log2SbW ][ log2SbH ][ n ][ 0 ] | |
| |   yC = ( yS << log2SbH ) + DiagScanOrder[ log2SbW ][ log2SbH ][ n ][ 1 ] | |
| |   AbsLevelPass2[ xC ][ yC ] = AbsLevelPass1[ xC ][ yC ] | |

FIG. 14

| | | |
|---|---|---|
| (b) | `for( j = 1; j < 5; j++ ) {` | |
| | `  if( abs_level_gtx_flag[ n ][ j - 1 ] ) {` | |
| | `    abs_level_gtx_flag[ n ][ j ]` | ae(v) |
| | `    ...` | ... |
| | `  }` | |
| | `  AbsLevelPass2[ xC ][ yC ] += 2 * abs_level_gtx_flag[ n ][ j ]` | |
| | `}` | |
| | `lastScanPosPass2 = n` | |
| | `}` | |
| | `/* remainder scan pass */` | |
| | `for( n = 0; n <= numSbCoeff - 1; n++ ) {` | |
| | `  xC = ( xS << log2SbW ) + DiagScanOrder[ log2SbW ][ log2SbH ][ n ][ 0 ]` | |
| | `  yC = ( yS << log2SbH ) + DiagScanOrder[ log2SbW ][ log2SbH ][ n ][ 1 ]` | |
| | `  if( ( n <= lastScanPosPass2 && AbsLevelPass2[ xC ][ yC ] >= 10 ) \|\|` | |
| | `      ( n>lastScanPosPass2 && n<=lastScanPosPass1 && AbsLevelPass1[xC][yC]>=2 )  \|\|` | |
| | `      ( n > lastScanPosPass1  && sb_coded_flag[ xS ][ yS ] ) )` | |
| | `    abs_remainder[ n ]` | ae(v) |
| | `  if( n <= lastScanPosPass2 )` | |
| | `    AbsLevel[ xC ][ yC ] = AbsLevelPass2[ xC ][ yC ] + 2 * abs_remainder[ n ]` | |
| | `  else if( n <= lastScanPosPass1 )` | |
| | `    AbsLevel[ xC ][ yC ] = AbsLevelPass1[ xC ][ yC ] + 2 * abs_remainder[ n ]` | |
| | `  else { /* bypass */` | |
| | `    AbsLevel[ xC ][ yC ] = abs_remainder[ n ]` | |
| | `  if( abs_remainder[ n ] )` | |
| | `    coeff_sign_flag[ n ]` | ae(v) |
| | `  }` | |
| | `  if( BdpcmFlag[ x0 ][ y0 ][ cIdx ] == 0 && n <= lastScanPosPass1 ) {` | |
| | `    absLeftCoeff = xC > 0 ? AbsLevel[ xC - 1 ][ yC ] ) : 0` | |
| | `    absAboveCoeff = yC > 0 ? AbsLevel[ xC ][ yC - 1 ] ) : 0` | |
| | `    predCoeff = Max( absLeftCoeff, absAboveCoeff )` | |
| | `    if( AbsLevel[ xC ][ yC ] == 1 && predCoeff > 0 )` | |
| | `      AbsLevel[ xC ][ yC ] = predCoeff` | |
| | `    else if( AbsLevel[ xC ][ yC ] > 0 && AbsLevel[ xC ][ yC ] <= predCoeff )` | |
| | `      AbsLevel[ xC ][ yC ]--` | |
| | `  }` | |
| | | |
| | `  TransCoeffLevel[x0][y0][cIdx][xC][yC] = (1-2*coeff_sign_flag[n]) * AbsLevel[xC][yC]` | |
| | `}` | |
| | `}` | |

FIG. 15

(a)
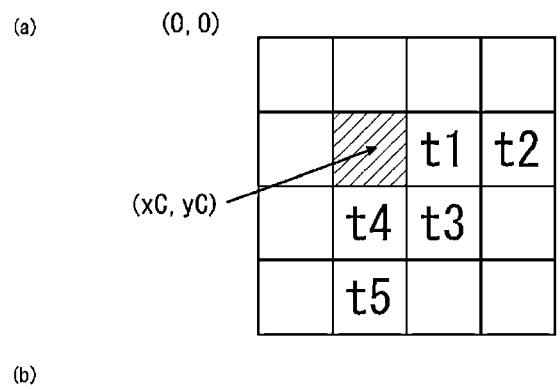
(b)
| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 1 | 1 | 1 | 1 | 1 | 1 | 1 | 2 | 2 |
| locSumAbs | 16 | 17 | 18 | 19 | 20 | 21 | 22 | 23 | 24 | 25 | 26 | 27 | 28 | 29 | 30 | 31 |
| cRiceParam | 2 | 2 | 2 | 2 | 2 | 2 | 2 | 2 | 2 | 2 | 2 | 2 | 3 | 3 | 3 | 3 |
(c)
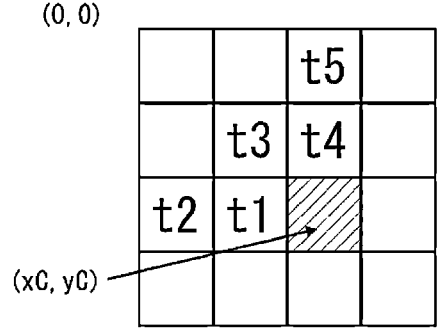
FIG. 17

| | TR | EG(k) | | TR+EG(k) |
|---|---|---|---|---|
| bitDepth | maxPrefixValTR | maxPreExtLen | truncSuffixLen | maxPrefixValTR +maxPreExtLen+ truncSuffixLen |
| 8 | 6 | 11 | 15 | 32 |
| 9 | 6 | 11 | 15 | 32 |
| 10 | 6 | 11 | 15 | 32 |
| 11 | 6 | 11 | 15 | 32 |
| 12 | 6 | 11 | 15 | 32 |
| 13 | 6 | 11 | 15 | 32 |
| 14 | 6 | 11 | 15 | 32 |
| 15 | 6 | 11 | 15 | 32 |
| 16 | 6 | 11 | 15 | 32 |

FIG. 20

| bitDepth | TR | EG(k) | | TR+EG(k) |
|---|---|---|---|---|
| | maxPrefixValTR | maxPreExtLen | truncSuffixLen | maxPrefixValTR +maxPreExtLen+ truncSuffixLen |
| 8 | 6 | 11 | 15 | 32 |
| 9 | 6 | 11 | 15 | 32 |
| 10 | 6 | 10 | 16 | 32 |
| 11 | 6 | 9 | 17 | 32 |
| 12 | 6 | 8 | 18 | 32 |
| 13 | 6 | 7 | 19 | 32 |
| 14 | 6 | 6 | 20 | 32 |
| 15 | 6 | 5 | 21 | 32 |
| 16 | 6 | 4 | 22 | 32 |

| TR | EG(k) | | Scaling & Transform | | | |
|---|---|---|---|---|---|---|
| maxPrefixValTR (prefixValTR) | maxPreExtLen | truncSuffixLen | CoeffMin | CoeffMax | bdShift1 | bdShift2 |
| 6 | 26 - log2CoeffRange | log2CoeffRange | -(1<<log2CoeffRange) | (1 << log2CoeffRange) - 1 | BitDepth + 1 0 - log2TransformRange + ... | 5 + log2TransformRange - BitDepth |

(b)

| TR | EG(k) | | TR+EG(k) |
|---|---|---|---|
| maxPrefixValTR | maxPreExtLen | truncSuffixLen | maxPrefixValTR +maxPreExtLen+ truncSuffixLen |
| 6 | 11 | Max(BitDepth+ bdoffsetC, 15) | 32 |

(c) EXAMPLE OF bdoffsetC = 3

| | TR | EG(k) | | TR+EG(k) |
|---|---|---|---|---|
| bitDepth | maxPrefixValTR | maxPreExtLen | truncSuffixLen | maxPrefixValTR +maxPreExtLen+ truncSuffixLen |
| 8 | 6 | 11 | 15 | 32 |
| 9 | 6 | 11 | 15 | 32 |
| 10 | 6 | 11 | 15 | 32 |
| 11 | 6 | 11 | 15 | 32 |
| 12 | 6 | 11 | 15 | 32 |
| 13 | 6 | 10 | 16 | 32 |
| 14 | 6 | 9 | 17 | 32 |
| 15 | 6 | 8 | 18 | 32 |
| 16 | 6 | 7 | 19 | 32 |

| TR | EG(k) | | Scaling & Transform | | | |
|---|---|---|---|---|---|---|
| maxPrefixValTR (prefixValTR) | maxPreExtLen | truncSuffixLen | CoeffMin | CoeffMax | bdShift1 | bdShift2 |
| 6 | 26 - log2CoeffRange | log2CoeffRange | -(1<<log2TransformRange) | ( 1 << log2TransformRange) - 1 | BitDepth + 10 - log2TransformRange + ... | 5 + log2TransformRange - BitDepth |

(b)

| TR | EG(k) | | TR+EG(k) |
|---|---|---|---|
| maxPrefixValTR | maxPreExtLen | truncSuffixLen | maxPrefixValTR +maxPreExtLen+ truncSuffixLen |
| 6 | 11 | Max(BitDepth+ bdoffsetC, 15) | 32 |

(c) EXAMPLE OF bdoffsetC = 3

| | TR | EG(k) | | TR+EG(k) |
|---|---|---|---|---|
| bitDepth | maxPrefixValTR | maxPreExtLen | truncSuffixLen | maxPrefixValTR +maxPreExtLen+ truncSuffixLen |
| 8 | 6 | 11 | 15 | 32 |
| 9 | 6 | 11 | 15 | 32 |
| 10 | 6 | 11 | 15 | 32 |
| 11 | 6 | 11 | 15 | 32 |
| 12 | 6 | 11 | 15 | 32 |
| 13 | 6 | 10 | 16 | 32 |
| 14 | 6 | 9 | 17 | 32 |
| 15 | 6 | 8 | 18 | 32 |
| 16 | 6 | 7 | 19 | 32 |

| TR | EG(k) | | Scaling & Transform | | | |
|---|---|---|---|---|---|---|
| maxPrefixVal TR (prefixValTR) | maxPreExtLen | truncSuffixLen | CoeffMin | CoeffMax | bdShift1 | bdShift2 |
| 6 | 26 - Min (maxSuffix, log2TransformRange) | Min (maxSuffix, log2TransformRange) | -(1<<log2TransformRange) | ( 1 << log2TransformRange) - 1 | BitDepth + 10 - log2TransformRange + ... | 5 + log2TransformRange - BitDepth |

(b)

| TR | EG(k) | | TR+EG(k) |
|---|---|---|---|
| maxPrefixValTR | maxPreExtLen | truncSuffixLen | maxPrefixValTR +maxPreExtLen+ truncSuffixLen |
| 6 | 26 - truncSuffixLen | Min (Max(BitDepth+ bdoffsetT, 15), maxSuffix) | 32 |

(c) EXAMPLE OF maxSuffix = 20

| | TR | EG(k) | | TR+EG(k) |
|---|---|---|---|---|
| bitDepth | maxPrefixValTR | maxPreExtLen | truncSuffixLen =log2CoeffRange | maxPrefixValTR +maxPreExtLen+ truncSuffixLen |
| 8 | 6 | 11 | 15 | 32 |
| 9 | 6 | 11 | 15 | 32 |
| 10 | 6 | 10 | 16 | 32 |
| 11 | 6 | 9 | 17 | 32 |
| 12 | 6 | 8 | 18 | 32 |
| 13 | 6 | 7 | 19 | 32 |
| 14 | 6 | 6 | 20 | 32 |
| 15 | 6 | 6 | 20 | 32 |
| 16 | 6 | 6 | 20 | 32 |

| TR | EG(k) | | Scaling & Transform | | | |
|---|---|---|---|---|---|---|
| maxPrefixValTR (prefixValTR) | maxPreExtLen | truncSuffixLen | CoeffMin | CoeffMax | bdShift1 | bdShift2 |
| 6 | 11 | log2TransformRange | −(1<<log2TransformRange) | ( 1 << log2TransformRange ) − 1 | BitDepth + 10 − log2TransformRange + ... | 5 + log2TransformRange − BitDepth |

(b)

| TR | EG(k) | | TR+EG(k) |
|---|---|---|---|
| maxPrefixValTR | maxPreExtLen | truncSuffixLen | maxPrefixValTR +maxPreExtLen+ truncSuffixLen |
| 6 | 11 | Max(15,BitDepth+bdoffsetT) | 32~ |

(c)

| bitDepth | TR | EG(k) | | TR+EG(k) |
|---|---|---|---|---|
| | maxPrefixValTR | maxPreExtLen | truncSuffixLen =log2CoeffRange | maxPrefixValTR +maxPreExtLen+ truncSuffixLen |
| 8 | 6 | 11 | 15 | 32 |
| 9 | 6 | 11 | 15 | 32 |
| 10 | 6 | 11 | 16 | 33 |
| 11 | 6 | 11 | 17 | 34 |
| 12 | 6 | 11 | 18 | 35 |
| 13 | 6 | 11 | 19 | 36 |
| 14 | 6 | 11 | 21 | 37 |
| 15 | 6 | 11 | 22 | 38 |
| 16 | 6 | 11 | 23 | 39 |

| TR | EG(k) | | Scaling & Transform | | | |
|---|---|---|---|---|---|---|
| maxPrefixValTR (prefixValTR) | maxPreExtLen | truncSuffixLen | CoeffMin | CoeffMax | bdShift1 | bdShift2 |
| 6 | Max(minPreExt, 26 - log2CTransformRange) | log2TransformRange | -(1<<log2TransformRange) | (1 << log2TransformRange) - 1 | BitDepth + 10 - log2TransformRange + ... | 5 + log2TransformRange - BitDepth |

(b)

| TR | EG(k) | | TR+EG(k) |
|---|---|---|---|
| maxPrefixValTR | maxPreExtLen | truncSuffixLen | maxPrefixValTR +maxPreExtLen+ truncSuffixLen |
| 6 | Max( minPreExt, 26 - log2TransformRange) | log2TransformRange | 32~ |

(c)

| | TR | EG(k) | | TR+EG(k) |
|---|---|---|---|---|
| bitDepth | maxPrefixValTR | maxPreExtLen | truncSuffixLen | maxPrefixValTR +maxPreExtLen+ truncSuffixLen |
| 8 | 6 | 11 | 15 | 32 |
| 9 | 6 | 11 | 15 | 32 |
| 10 | 6 | 10 | 16 | 32 |
| 11 | 6 | 9 | 17 | 32 |
| 12 | 6 | 8 | 18 | 32 |
| 13 | 6 | 7 | 19 | 32 |
| 14 | 6 | 6 | 20 | 32 |
| 15 | 6 | 6 | 21 | 33 |
| 16 | 6 | 6 | 22 | 34 |

| TR | EG(k) | | Scaling & Transform | | | |
|---|---|---|---|---|---|---|
| maxPrefixVal TR (prefixValTR) | maxPreExtLen | truncSuffixLen | CoeffMin | CoeffMax | bdShift1 | bdShift2 |
| 6 | 26 - Min (maxSuffix, log2Transfor mRange) | log2Transfor mRange | - (1<<log2Tran sformRange) | ( 1 << log2Transfor mRange) - 1 | BitDepth + 1 0 - log2Tran sformRange + ... | 5 + log2Transfor mRange - BitDepth |

(b)

| TR | EG(k) | | TR+EG(k) |
|---|---|---|---|
| maxPrefixValTR | maxPreExtLen | truncSuffixLen | maxPrefixValTR +maxPreExtLen+ truncSuffixLen |
| 6 | 26 - Min (maxSuffix, log2TransformR ange) | log2TransformR ange | 32 |

(c)

| | TR | EG(k) | | TR+EG(k) |
|---|---|---|---|---|
| bitDepth | maxPrefixValTR | maxPreExtLen | truncSuffixLen | maxPrefixValTR +maxPreExtLen+ truncSuffixLen |
| 8 | 6 | 11 | 15 | 32 |
| 9 | 6 | 11 | 15 | 32 |
| 10 | 6 | 10 | 16 | 32 |
| 11 | 6 | 9 | 17 | 32 |
| 12 | 6 | 8 | 18 | 32 |
| 13 | 6 | 7 | 19 | 32 |
| 14 | 6 | 6 | 20 | 32 |
| 15 | 6 | 6 | 21 | 33 |
| 16 | 6 | 6 | 22 | 34 |

| TR | EG(k) | | Scaling & Transform | | | |
|---|---|---|---|---|---|---|
| maxPrefixValTR (prefixValTR) | maxPreExtLen | truncSuffixLen | CoeffMin | CoeffMax | bdShift1 | bdShift2 |
| 6 | 26 - log2CoeffRange | log2TransformRange | -(1<<log2TransformRange) | (1 << log2TransformRange) - 1 | BitDepth + 10 - log2TransformRange + ... | 5 + log2TransformRange - BitDepth |

(b)

| TR | EG(k) | | TR+EG(k) |
|---|---|---|---|
| maxPrefixValTR | maxPreExtLen | truncSuffixLen | maxPrefixValTR +maxPreExtLen+ truncSuffixLen |
| 6 | 26 - log2CoeffRange | log2TransformRange | 32~ |

(c)

| | TR | EG(k) | | TR+EG(k) |
|---|---|---|---|---|
| bitDepth | maxPrefixValTR | maxPreExtLen | truncSuffixLen | maxPrefixValTR +maxPreExtLen+ truncSuffixLen |
| 8 | 6 | 11 | 15 | 32 |
| 9 | 6 | 11 | 15 | 32 |
| 10 | 6 | 11 | 16 | 33 |
| 11 | 6 | 11 | 17 | 34 |
| 12 | 6 | 11 | 18 | 35 |
| 13 | 6 | 10 | 19 | 35 |
| 14 | 6 | 9 | 20 | 35 |
| 15 | 6 | 8 | 21 | 35 |
| 16 | 6 | 7 | 22 | 35 |

FIG. 28

IMAGE DECODING APPARATUS AND IMAGE CODING APPARATUS

TECHNICAL FIELD

Embodiments of the present invention relate to an image decoding apparatus and an image coding apparatus.

BACKGROUND ART

An image coding apparatus which generates coded data by coding an image, and an image decoding apparatus which generates decoded images by decoding the coded data are used for efficient transmission or recording of images.

Specific image coding schemes include, for example, H.264/AVC and a High-Efficiency VideoCoding (HEVC) scheme.

In such an image coding scheme, images (pictures) constituting a video are managed in a hierarchical structure including slices obtained by splitting an image, coding tree units (CTUs) obtained by splitting a slice, units of coding (which may also be referred to as coding units (CUs)) obtained by splitting a coding tree unit, and transform units (TUs) obtained by splitting a coding unit, and are coded/decoded for each CU.

In such an image coding scheme, usually, a prediction image is generated based on a local decoded image that is obtained by coding/decoding an input image (a source image), and prediction errors (which may be referred to also as "difference images" or "residual images") obtained by subtracting the prediction image from the input image are coded. Generation methods of prediction images include an inter-picture prediction (inter prediction) and an intra-picture prediction (intra prediction).

Examples of image coding and decoding techniques of recent years include NPL 1 (VVC) and NPL 2 (H.265/HEVC). NPL 1 defines a main profile corresponding to a bit-depth of 10 bits. NPL 1 discloses a technique for limiting a range of a value by using a shift value bdShift1 in inverse quantization, a shift value bdSfhit2 used in discrete transform (DCT transform) in a horizontal and a vertical directions, and clipping after the first transform. In NPL 2, depending on an extended_precision_processing_flag flag, bdShift1, bdShift2, and a clipping value are adjusted in accordance with the bit-depth. NPL 2 discloses a technique for improving precision by increasing the range of a transform coefficient in accordance with the bit-depth. NPL 2 also discloses a technique for efficiently coding a residual by using a code obtained by combining a TruncatedRice (TR) code and an exponential Golomb code EG(k) in a case that syntax elements are decoded that represent the absolute value of the transform coefficient.

CITATION LIST

Non Patent Literature

NPL 1: "Versatile Video Coding Editorial Refinements on Draft 10, JVET-T2001-v1, Joint Video Experts Team (JVET) of ITU-T SG 16 WP 3 and ISO/IEC JTC1/SC 29 20th Meeting, by teleconference, 7-16 Oct. 2020

NPL 2: High efficiency video coding, ITU-T H. 265 TELECOMMUNICATION STANDARDIZATION SECTOR OF ITU (November 2019)

SUMMARY OF INVENTION

Technical Problem

In NPL 2, in a case that the range of a transform coefficient is increased in accordance with the bit-depth, truncSuffixLen is similarly increased in the EG(k) coding to allow even a large residual to be accurately expressed. truncSuffixLen is a bit-depth used in an escape portion of a suffix. However, in a case that the escape portion is made larger than necessary, there is a problem in that the precision fails to be increased, whereas complexity increases. NPL 2 discloses a configuration in which a residual is coded by a prefix of the TR code and an exp portion and the escape portion of the suffix of the EG(k) code. Then, the total value of the length of the prefix of binarization by the TR code, the length maxPreExtLen of the exp portion of the EG(k) code, and the length truncSuffixLen of the escape portion of the EG(k) code is maintained at a prescribed value (32). However, a problem with this configuration is that in a case that truncSuffixLen is increased in accordance with the bit-depth in the same manner as the range of the transform coefficient, maxPreExtLen decreases to maintain the prescribed total value (32), preventing a large residual value from being efficiently expressed.

Solution to Problem

To solve the above-described problems, an image decoding apparatus according to an aspect of the present invention includes a TU decoder configured to decode, from coded data, a syntax element representing an absolute value of a transform coefficient, a scaling unit configured to multiply a transform coefficient by a quantization-parameter dependent value and perform right-shift by a first shift value, and to perform clipping using a minimum value and a maximum value according to a first range, and an inverse conversion processing unit configured to convert a scaled transform coefficient, perform clipping using the minimum value and the maximum value according to the first range to derive an intermediate coefficient, further transform an intermediate variable, and perform right-shift by a second shift value. The scaling unit derives the first range, the first shift value, and the second shift value in accordance with a value of a first bit-depth, and limits the first range to be equal to or less than a prescribed value.

Advantageous Effects of Invention

According to the configuration described above, any one of the problems described above can be solved.

BRIEF DESCRIPTION OF DRAWINGS

FIG. 9 is a diagram illustrating syntax elements related to a quantized transform coefficient.

FIG. 10 is a diagram illustrating syntax elements related to a quantized transform coefficient.

FIG. 11 is a syntax table related to RRC.

FIG. 12 is a syntax table related to RRC.

FIG. 13 is a syntax table related to RRC.

FIG. 14 is a syntax table related to TSRC.

FIG. 15 is a syntax table related to TSRC.

FIG. 17 is a diagram related to Rice parameter derivation.

FIG. 20 is a diagram illustrating an example of the bit-depth and the code length of the syntax of the residual in a case that precision is not extended.

FIG. 21 is a diagram illustrating an example of the bit-depth and the code length of the syntax of the residual in a case that the precision in HEVC is extended.

FIG. 22 is a diagram illustrating the relationship between the bit-depth, the bit-depth of the syntax of the residual, and the shift lengths of inverse quantization and inverse transform according to the present invention.

FIG. 23 is a diagram illustrating the relationship between the bit-depth, the bit-depth of the syntax of the residual, and the shift lengths of inverse quantization and inverse transform according to the present invention.

FIG. 24 is a diagram illustrating the relationship between the bit-depth, the bit-depth of the syntax of the residual, and the shift lengths of inverse quantization and inverse transform according to the present invention.

FIG. 25 is a diagram illustrating the relationship between the bit-depth, the bit-depth of the syntax of the residual, and the shift lengths of inverse quantization and inverse transform according to the present invention.

FIG. 26 is a diagram illustrating the relationship between the bit-depth, the bit-depth of the syntax of the residual, and the shift lengths of inverse quantization and inverse transform according to the present invention.

FIG. 27 is a diagram illustrating the relationship between the bit-depth, the bit-depth of the syntax of the residual, and the shift lengths of inverse quantization and inverse transform according to the present invention.

FIG. 28 is a diagram illustrating the relationship between the bit-depth, the bit-depth of the syntax of the residual, and the shift lengths of inverse quantization and inverse transform according to the present invention.

DESCRIPTION OF EMBODIMENTS

Embodiment 1

Hereinafter, an embodiment of the present invention will be described with reference to the drawings.

Figure 1:
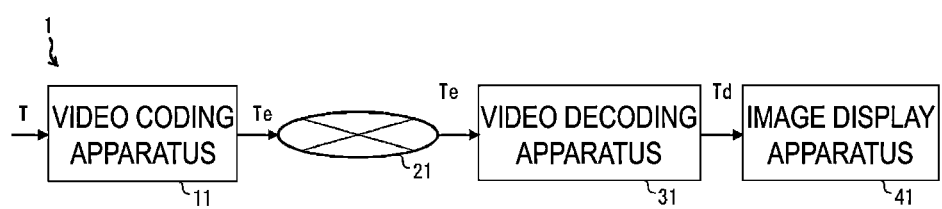
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a coding target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and an image display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bi-directional communication network, and may be a unidirectional communication network configured to transmit broadcast waves of digital terrestrial television broadcasting, satellite broadcasting, or the like. Furthermore, the network 21 may be substituted by a storage medium in which the coding stream Te is recorded, such as a Digital Versatile Disc (DVD: trade name) or a Blue-ray Disc (BD: trade name).

The video decoding apparatus 31 decodes each of the coding streams Te transmitted from the network 21 and generates one or multiple decoded images Td.

The image display apparatus 41 displays all or part of one or multiple decoded images Td generated by the video decoding apparatus 31. For example, the image display apparatus 41 includes a display device such as a liquid crystal display and an organic Electro-Luminescence (EL) display. Forms of the display include a stationary type, a mobile type, an HMD type, and the like. In a case that the video decoding apparatus 31 has a high processing capability, an image having high image quality is displayed, and in a case that the apparatus has a lower processing capability, an image which does not require high processing capability and display capability is displayed.

Operator

Operators used in the present specification will be described below.

\>> is a right bit shift, << is a left bit shift, & is a bitwise AND, | is a bitwise OR, |= is an OR assignment operator, and || indicates a logical sum.

x ? y: z is a ternary operator that takes y in a case that x is true (other than 0) and takes z in a case that x is false (0).

Clip3(a, b, c) is a function to clip c in a value of a to b, and a function to return a in a case that c is smaller than a (c<a), return b in a case that c is greater than b (c>b), and return c in the other cases (provided that a is smaller than or equal to b (a<=b)).

abs (a) is a function that returns the absolute value of a.

Int (a) is a function that returns the integer value of a.

floor (a) is a function that returns a minimum integer equal to or smaller than a.

ceil(a) is a function that returns a maximum integer greater than or equal to a.

a/d represents division of a by d (round down decimal places).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
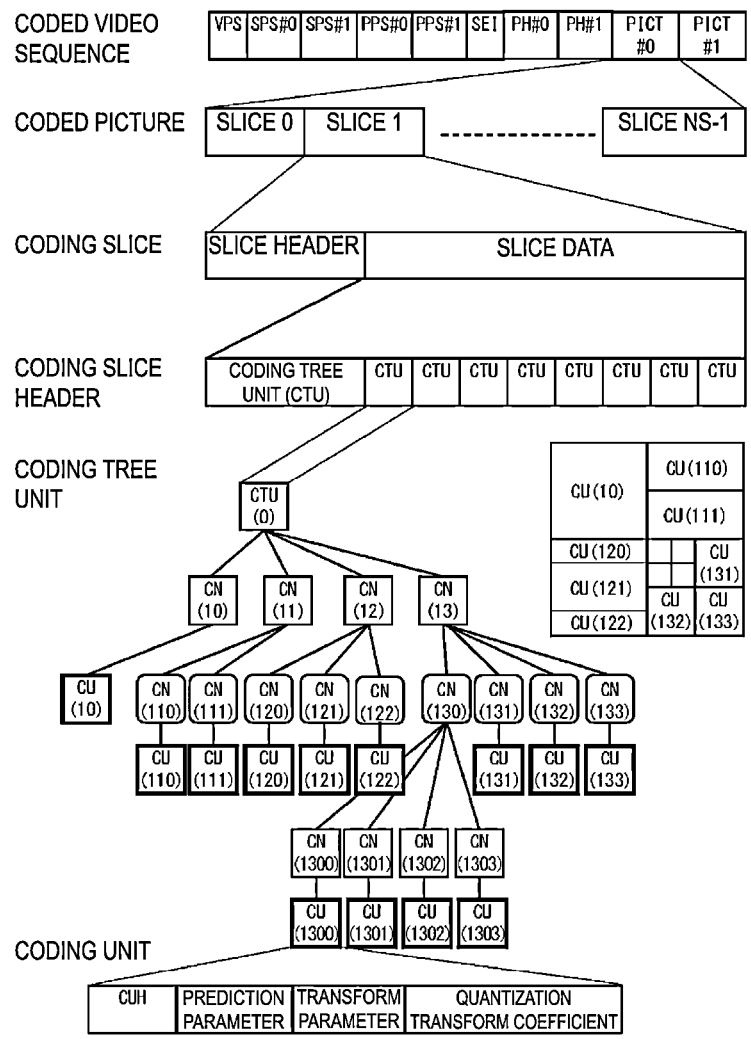
FIG. 4 is a diagram illustrating a hierarchical structure of data of a coding stream.

FIG. 4 is a diagram illustrating a hierarchical structure of data of the coding stream Te. The coding stream Te includes a sequence and multiple pictures constituting the sequence illustratively. FIG. 4 is a diagram illustrating each of a coded video sequence defining a sequence SEQ, a coded picture prescribing a picture PICT, a coding slice prescribing a slice S, coding slice data prescribing slice data, a coding tree unit included in the coding slice data, and a coding unit included in the coding tree unit.

Coded Video Sequence

In the coded video sequence, a set of data referenced by the video decoding apparatus 31 to decode the sequence SEQ to be processed is defined. As illustrated in the coded video sequence of FIG. 4, the sequence SEQ includes a Video Parameter Set, a Sequence Parameter Set SPS, a Picture Parameter Set PPS, a picture header, a picture PICT, and Supplemental Enhancement Information SEI.

In the video parameter set VPS, in an image including multiple layers, a set of coding parameters common to multiple images and a set of coding parameters associated with the multiple layers and an individual layer included in the image are defined.

In the sequence parameter set SPS, a set of coding parameters referenced by the video decoding apparatus 31 to decode a target sequence is defined. For example, a width and a height of a picture are defined. Note that multiple SPSs may exist. In that case, any of the multiple SPSs is selected from the PPS.

In the picture parameter set PPS, a set of coding parameters referenced by the video decoding apparatus 31 to decode each picture in a target sequence is defined. For example, a reference value (pic_init_qp_minus26) of a quantization step size used for decoding of a picture, a flag (weighted_pred_flag) indicating an application of a weighted prediction, and a scaling list (quantization matrix) are included. Note that multiple PPSs may exist. In that case, any of the multiple PPSs is selected from each picture in a target sequence.

In the picture header, coding parameters common to all slices included in one coded picture are defined. For example, the coding parameters include Picture Order Count (POC) and a coding parameter related to a split.

Coded Picture

In the coded picture, a set of data referenced by the video decoding apparatus 31 to decode the picture PICT to be processed is defined. As illustrated in the coded picture of FIG. 4, the picture PICT includes a slice 0 to a slice NS−1 (NS is the total number of slices included in the picture PICT).

Note that in a case that it is not necessary to distinguish each of the slice 0 to the slice NS−1 below, subscripts of reference signs may be omitted. The same applies to other data with subscripts included in the coding stream Te which will be described below.

Coding Slice

In the coding slice, a set of data referenced by the video decoding apparatus 31 to decode the slice S to be processed is defined. As illustrated in the coding slice of FIG. 4, the slice includes a slice header and slice data.

The slice header includes a coding parameter group referenced by the video decoding apparatus 31 to determine a decoding method for a target slice. Slice type indication information (slice_type) indicating a slice type is one example of a coding parameter included in the slice header.

Examples of slice types that can be indicated by the slice type indication information include (1) I slice using only an intra prediction in coding, (2) P slice using a unidirectional prediction or an intra prediction in coding, and (3) B slice using a unidirectional prediction, a bi-directional prediction, or an intra prediction in coding, and the like. Note that the inter prediction is not limited to a uni-prediction and a bi-prediction, and the prediction image may be generated by using a larger number of reference pictures. Hereinafter, in a case of being referred to as the P or B slice, a slice that includes a block in which the inter prediction can be used is indicated.

Note that the slice header may include a reference to the picture parameter set PPS (pic_parameter_set_id).

Coding Slice Data

In the coding slice data, a set of data referenced by the video decoding apparatus 31 to decode the slice data to be processed is defined. The slice data includes CTUs as illustrated in the coding slice header in FIG. 4. The CTU is a block of a fixed size (for example, 64×64) constituting a slice, and may also be called a Largest Coding Unit (LCU).

Coding Tree Unit

In the coding tree unit of FIG. 4, a set of data is defined that is referenced by the video decoding apparatus 31 to decode the CTU to be processed. The CTU is split into coding unit CUs, each of which is a basic unit of coding processing, by a recursive Quad Tree split (QT split), Binary Tree split (BT split), or Ternary Tree split (TT split). The BT split and the TT split are collectively referred to as a Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

Figure 5:
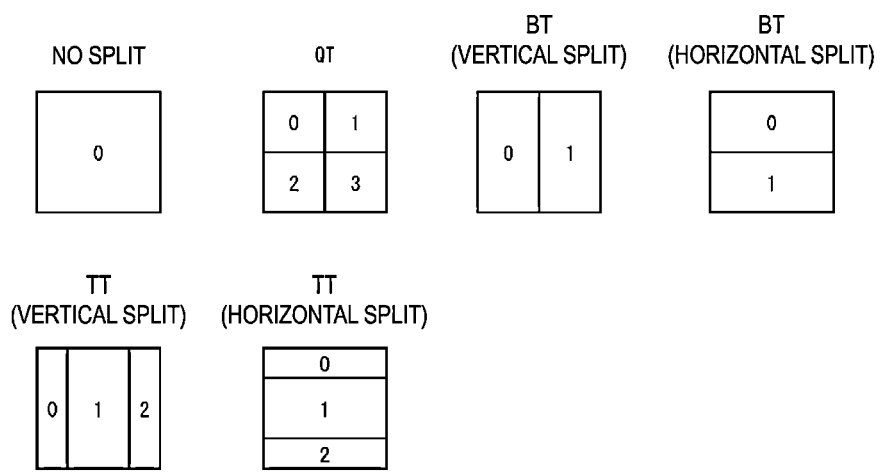
FIG. 5 is a diagram illustrating an example of split of a CTU.

The CT includes, as CT information, a split flag indicating whether to perform the QT split. FIG. 5 illustrates examples of split.

The CU is an end node of the coding nodes and is not split any further. The CU is a basic unit of coding processing.

Coding Unit

As illustrated in the coding unit of FIG. 4, a set of data referenced by the video decoding apparatus 31 to decode the coding unit to be processed is defined. Specifically, the CU includes a CU header CUH, a prediction parameter, a transform parameter, a quantized transform coefficient, and the like. In the CU header, a prediction mode and the like are defined.

There are cases that the prediction processing is performed in units of CU or performed in units of sub-CU in which the CU is further split. In a case that the sizes of the CU and the sub-CU are equal to each other, the number of sub-CUs in the CU is one. In a case that the CU is larger in size than the sub-CU, the CU is split into sub-CUs. For example, in a case that the CU has a size of 8×8, and the sub-CU has a size of 4×4, the CU is split into four sub-CUs by a horizontal split into two and a vertical split into two.

As types of prediction (prediction mode CuPredMode), there are at least two types, namely an intra prediction (MODE_INTRA) and an inter prediction (MODE_INTER). There may further be an intra block copy prediction (MODE_IBC). The intra prediction and the intra block copy prediction refer to predictions in an identical picture, and the inter prediction refers to a prediction processing performed between different pictures (for example, between pictures of different display times, and between pictures of different layer images).

Transform and quantization processing is performed in units of CU, but the quantized transform coefficient may be subjected to entropy coding in units of subblock such as 4×4.

A prediction image is derived by prediction parameters accompanying a block. The prediction parameters include prediction parameters for intra prediction and inter prediction.

Configuration of Video Decoding Apparatus

Figure 6:
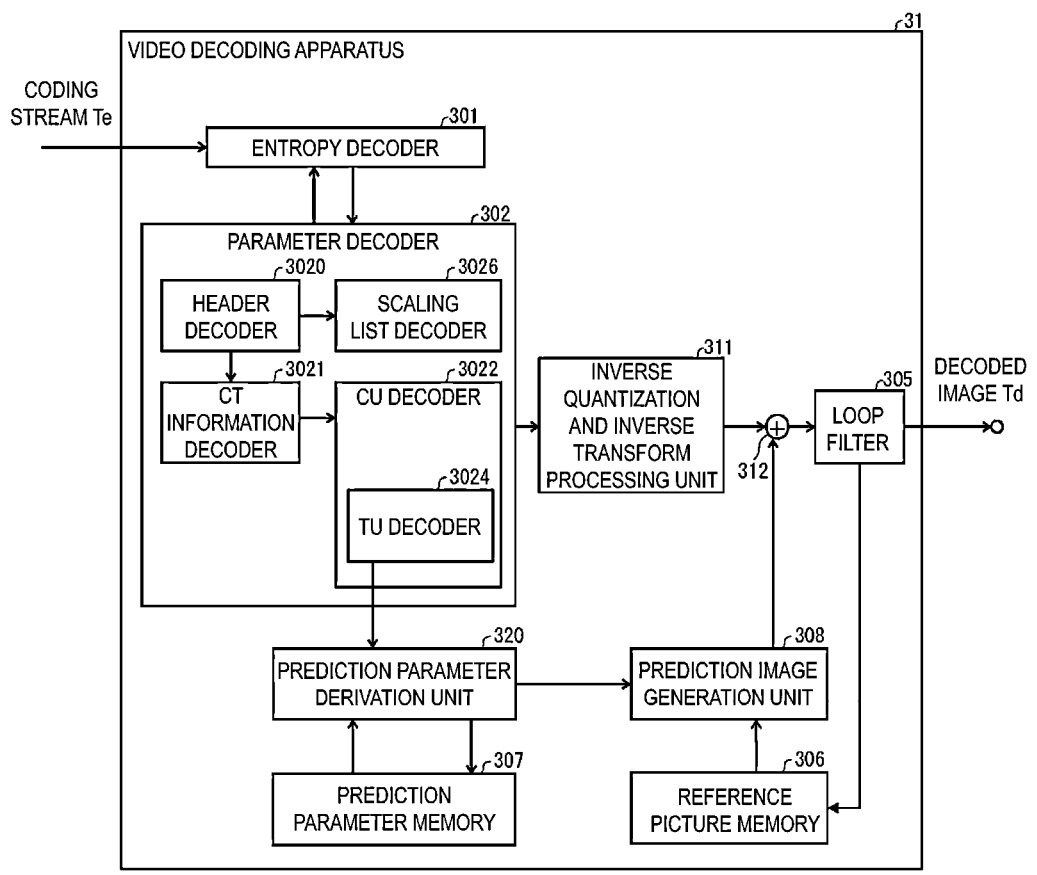
FIG. 6 is a schematic diagram illustrating a configuration of a video decoding apparatus.

The configuration of the video decoding apparatus 31 (FIG. 6) according to the present embodiment will be described.

The video decoding apparatus 31 includes an entropy decoder 301, a parameter decoder (a prediction image decoding apparatus) 302, a loop filter 305, a reference picture memory 306, a prediction parameter memory 307, a prediction image generation unit (prediction image generation apparatus) 308, an inverse quantization and inverse transform processing unit 311 (scaling unit), and an addition unit 312. Note that a configuration in which the loop filter 305 is not included in the video decoding apparatus 31 may be used in accordance with the video coding apparatus 11 described later.

The parameter decoder 302 further includes a header decoder 3020, a CT information decoder 3021, and a CU decoder 3022 (prediction mode decoder), and the CU decoder 3022 includes a TU decoder 3024. These may be collectively referred to as a decoding module. The header decoder 3020 decodes, from coded data, parameter set information such as the VPS, the SPS, and the PPS, and a slice header (slice information). The CT information decoder 3021 decodes a CT from coded data. The CU decoder 3022 decodes a CU from coded data. The TU decoder 3024 decodes a transform skip flag transform_skip_flag, QP update information (quantization correction value), and a quantized transform coefficient (residual_coding) from the coded data.

In a case that a size of the transform unit (tbWidth and tbHeight) is equal to or smaller than a prescribed maximum size (tbWidth<=MaxTsSize && tbHeight<=MaxTsSize), the TU decoder 3024 decodes transform_skip_flag [x0][y0][cIdx].

In a case that the TU includes a prediction error (for example, in a case that tu_cbf_luma[x0][y0] is 1), the TU decoder 3024 decodes, from the coded data, the QP update information and the quantized transform coefficient. Derivation of the quantized transform coefficient may involve multiple modes (for example, an RRC mode and a TSRC mode). Specifically, different processing operations may be performed between normal derivation of a prediction error using transform (Regular Residual Coding (RRC)) and derivation of a prediction error in a transform skip mode using no transform (Transform Skip Residual Coding (TSRC)). The QP update information is a difference value from a quantization parameter prediction value qPpred, which is a prediction value of a quantization parameter QP.

An example in which a CTU and a CU are used as units of processing is described below, but the processing is not limited to this example, and processing in units of sub-CU may be performed. Alternatively, the CTU and the CU may be replaced with a block, the sub-CU may be replaced with by a subblock, and processing may be performed in units of blocks or subblocks.

The entropy decoder 301 performs entropy decoding on the coding stream Te input from the outside and parses individual codes (syntax elements). The entropy coding includes a scheme in which syntax elements are subjected to variable length coding by using a context (probability model) that is adaptively selected according to a type of the syntax elements and a surrounding condition, and a scheme in which syntax elements are subjected to variable length coding by using a table or a calculation expression that is determined in advance. An example of the former is Context Adaptive Binary Arithmetic Coding (CABAC). The parsed codes include prediction information used to generate a prediction image, a prediction error used to generate a difference image, and the like.

The entropy decoder 301 outputs the separated codes to the parameter decoder 302. The separated codes refer to the prediction mode CuPredMode, for example. Which code is to be decoded is controlled based on an indication of the parameter decoder 302.

Basic Flow

Figure 7:
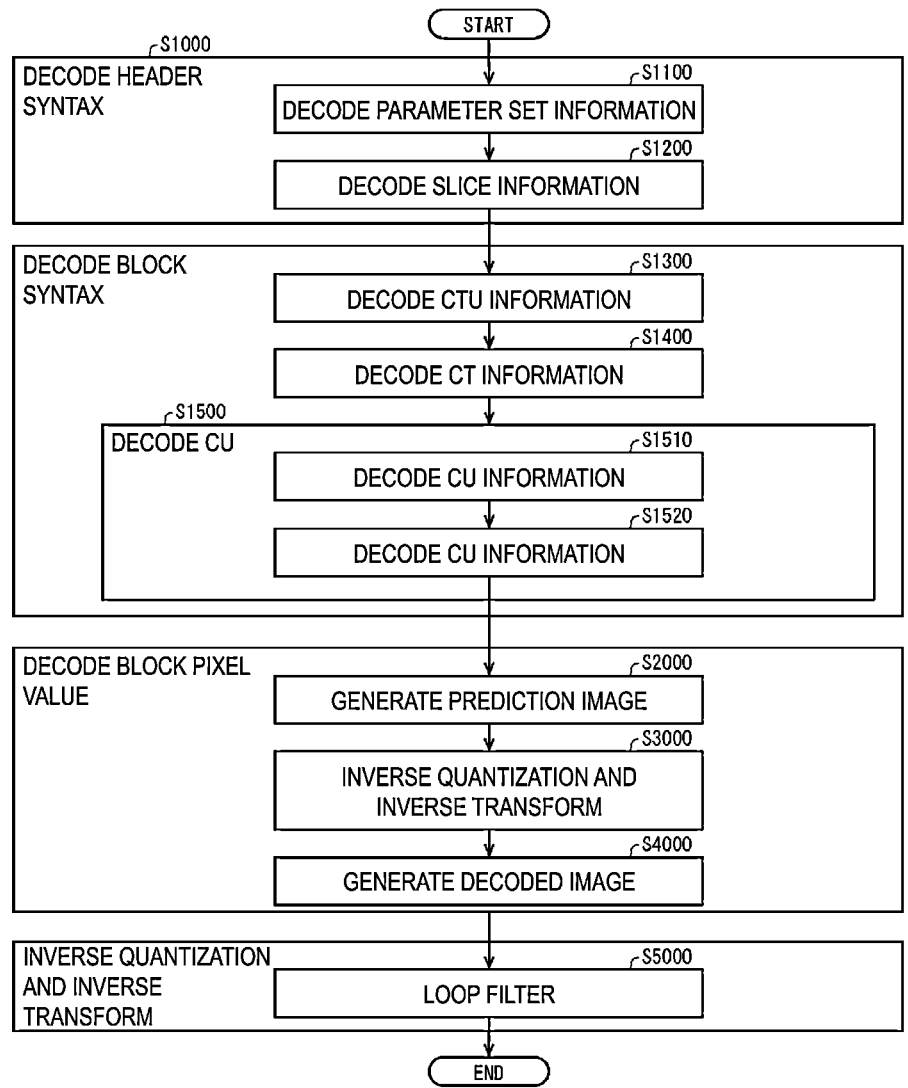
FIG. 7 is a flowchart for describing general operation performed in the video decoding apparatus.

FIG. 7 is a flowchart for describing general operation performed in the video decoding apparatus 31.

(S1100: Decoding of parameter set information) The header decoder 3020 decodes parameter set information such as the VPS, the SPS, the PPS, the SEI, PH, and the like from coded data.

(S1200: Decoding of slice information) The header decoder 3020 decodes a slice header (slice information) from the coded data.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data.

(S1400: Decoding of CT information) The CT information decoder 3021 decodes the CT from the coded data.

(S1500: Decoding of CU) The CU decoder 3022 decodes the CU from the coded data by performing S1510 and S1520. The CU decoder 3022 decodes a difference CuQpDeltaVal in the quantization parameter in units of CU from the coded data and derives the quantization parameter.

(S1510: Decoding of CU information) The CU decoder 3022 decodes, for example, CU information, prediction information, a TU split flag split_transform_flag, CU residual flags cbf_cb, cbf_cr, and cbf_luma from the coded data.

(S1520: Decoding of TU information) In a case that the TU includes a prediction error, the TU decoder 3024 decodes, from the coded data, QP update information and a quantized transform coefficient.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied by the prediction image generation unit 308 and the prediction error supplied by the inverse quantization and inverse transform processing unit 311.

(S5000: Loop filter) The loop filter 305 generates a decoded image by applying a loop filter such as a deblocking filter, a Sample Adaptive Filter (SAO), and an Adaptive Loop Filter (ALF) to the decoded image.

(Derivation of Quantized Transform Coefficient and Residual Coding)

In a case of lossless coding or in a case that the correlation between pixels of the original image is small, the coding efficiency may be higher in a case that no transform is performed. A technique that performs no transform is referred to as Transform Skip. Transform skip is also referred to as Identical Transform, and performs only scaling of transform coefficients in accordance with the quantization parameter. Whether transform skip is used is signaled using a syntax element transform_skip_flag. The transform_skip_flag may be signaled for each color component (cIdx) of Y, Cb, or Cr.

A coding and a decoding methods for a prediction error differ between normal derivation of a prediction error using transform (Regular Residual Coding (RRC)) and derivation of a prediction error in the transform skip mode (Transform Skip Residual Coding (TSRC)).

Figure 8:
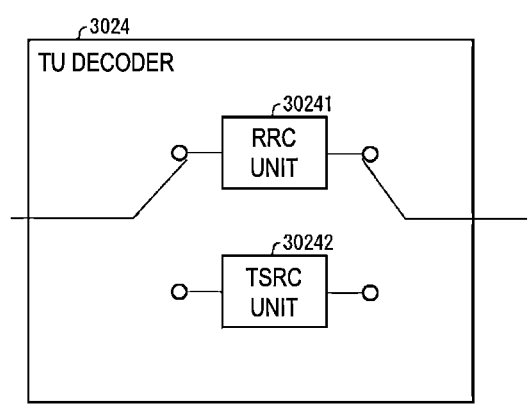
FIG. 8 is a schematic diagram illustrating a configuration of a TU decoder.

FIG. 8 is a block diagram of the TU decoder 3024, which includes an RRC unit 30241 and a TSRC unit 30242. The RRC unit 30241 is a processing unit that derives a normal prediction error using transform, and the TSRC unit 30242 is a processing unit that derives a prediction error in the transform skip mode.

sps_transform_skip_enabled_flag in FIG. 9(*a*) is a flag indicating whether transform_skip_flag is signaled in each TU. sps_transform_skip_enabled_flag=1 indicates that transform_skip_flag is signaled in each TU. sps_transform_skip_enabled_flag=0 indicates that transform_skip_flag is not signaled in each TU. In a case that sps_transform_skip_enabled_flag is not signaled, sps_transform_skip_enabled_flag is inferred to be 0.

transform_skip_flag [x0][y0][cIdx] in FIG. 10(*b*) indicates whether transform is applied to a block whose upper left coordinates are (x0, y0) and whose color components are cIdx. In a case that transform_skip_flag=1 (transform skip mode), no transform is applied to the block. In a case that transform_skip_flag=0, whether transform is applied to the block depends on other parameters.

FIG. 11 and FIG. 12 are syntaxes indicating coding methods for transform coefficients (prediction errors) in RRC and TSRC.

RRC Unit, RRC Mode

In the normal prediction error coding method with no transform skip (FIG. 11), the RRC unit 30241 decodes a syntax element (not illustrated) indicating the LAST position to derive the LAST position (LastSignificantCoeffX, LastSignificantCoeffY). The LAST position is the position of the last non-zero coefficient in a case that the transform coefficients of the TU are scanned in a direction from low frequency components to high frequency components. In a case that the transform coefficients (coefficients) are coded or decoded in order of decreasing frequency component, the LAST position indicates the position of a quantized transform coefficient to be decoded first. Then, the RRC unit 30241 decodes sb_coded_flag with reference to the LAST position. The sb_coded_flag is a flag indicating whether a sub-block includes a non-zero coefficient. The sub-block is a region corresponding to each of 4×4 units into which the TU is split. In a case that sb_coded_flag=1 (the sub-block includes a non-zero coefficient), the RRC unit 30241 decodes sig_coeff_flag. sig_coeff_flag is a flag indicating whether the coefficient value is non-zero. In a case that sig_coeff_flag=1 (coefficient value is non-zero), the RRC unit 30241 decodes abs_level_gtx_flag, par_level_flag, abs_remainder, and dec_abs_level. These are syntax elements that indicate the absolute values of the coefficients. abs_level_gtx_flag [n][j] is a flag indicating whether the absolute value of the coefficient at a scan position n is greater than (j<<1)+1. In a case that abs_level_gtx_flag [n][j] is not signaled, abs_level_gtx_flag [n][j] is inferred to be 0. par_level_flag [n] is the parity of the coefficient at the scan position n. In a case that par_level_flag [n][j] is not signaled, par_level_flag [n][j] is inferred to be 0. abs_remainder [n] represents the remaining absolute value of the coefficient at the scan position n and is decoded by a Golomb-Rice code. In a case that abs_remainder [n] is not signaled, abs_remainder [n] is inferred to be 0. dec_abs_level [n] is the absolute value of the residual for deriving the absolute value of the coefficient at the scan position n. In a case that dec_abs_level [n] is not signaled, dec_abs_level [n] is inferred to be 0. The RRC unit 30241 derives the absolute values of the coefficients from these syntax elements.

As described above, the RRC unit 30241 is characterized by decoding the LAST position in the sub-block of the TU.

TSRC Unit, TSRC Mode

In the prediction error coding method with no transform (transform skip mode) (FIG. 12), the TSRC unit 30242 decodes sb_coded_flag of each sub-block. In a case that sb_coded_flag=1 (sub-block includes a non-zero coefficient), the TSRC unit 30242 decodes sig_coeff_flag [xC] [yC] of the transform coefficient at the position (xC, xC) in the sub-block. In a case that sig_coeff_flag=1 (coefficient value is non-zero), the TSRC unit 30242 decodes coeff_sign_flag, abs_level_gtx_flag, par_level_flag, and abs_remainder. These syntax elements indicate the absolute values of the coefficients and are defined as described above. The TSRC unit 30242 derives the absolute values of the coefficients from these syntax elements.

As described above, the TSRC unit 30242 is characterized by not decoding the LAST position in the sub-block of the TU.

Decoding of abs_remainder and dec_abs_level

The TU decoder 3024 decodes the syntax value of the residual absolute value (abs_remainder or dec_abs_level, hereinafter referred to as a residual) from the coded data by using the Rice parameter cRiceParam. For binarization of the syntax, a code including a prefix and a suffix is used. An alpha code of the Golomb-Rice code and fixed-length binarization by the Golomb-Rice code may be used as the prefix and suffix. The suffix may be an Exponential-Golomb code (EG(k)) code. The "absolute value of a residual of a transform coefficient (residual absolute value)", coded as a syntax element, is simply expressed as the "residual".

In an example described in the present embodiment, a Truncated Rice (TR) code is used as a Golomb-Rice code, the prefix is separated into prefixValTR and suffixValTR, which are separately coded, and for the EG(k) code, the suffix is separated into expVal corresponding to an exp portion and escapeVal corresponding to an escape portion, which are separately coded. The quotient obtained by dividing the residual (abs_remainder or dec_abs_level) by 1<<cRiceParam or (((1<<expVal))−1)<<cRiceParam is coded using prefixValTR or expVal. The remainder of the residual (abs_remainder or dec_abs_level) divided by 1<<cRiceParam or (1<<expVal<<cRiceParam) is coded using suffixValTR or escapeVal. In other words, the residual is coded as follows.

((prefixValTR+((1<<expVal−1)))<<*c*RiceParam)+ suffixValTR+escapeVal

In a case that the residual is smaller than or equal to a prescribed value cMax, only prefixValTR and suffixValTR are coded.

prefixVal=(prefixValTR<<cRiceParam)+suffixValTR

In a case that the residual is greater than the prescribed value (in a case that suffixVal is present), expVal and escapeVal are coded in addition to prefixValTR indicating prefixVal equal to cMax.

prefixVal=(prefixValTR<<cRiceParam)=cMax suffixVal=(((1<<expVal)−1)<<cRiceParam)+escapeVal Here, the residual can be expressed as described below. The residual that can be expressed only by the prefix is as follows.

Residual=((prefixValTR)<<cRiceParam)+suffixValTR

Otherwise (in a case that the residual cannot be expressed only by the prefix, or in a case that prefixValTR=6), the residual is as follows.

Residual=((prefixValTR+(1<<(expVal)−1))<<cRiceParam)+escapeVal prefixVal and suffixVal may be defined as follows.

prefixVal=(prefixValTR<<cRiceParam)+suffixValTR suffixVal=(((2<<expVal)−2)<<cRiceParam)+escapeVal Flow First, the TU decoder 3024 derives the maximum value cMax of the prefix prefixVal from cRiceParam.

cMax=6<<cRiceParam

Here, 6 is the maximum value of prefixValTR. The maximum value is also referred to as maxPrefixValTR.

The TU decoder 3024 decodes the value of the prefix (prefixVal) from the coded data based on binarization of the Truncated Rice (TR) code described below. Note that the relationship between the prefix and the residual is as follows.

prefixVal=Min(cMax,abs_remainder[n])

Alternatively, the following may be used.

prefixVal=Min(cMax,dec_abs_level)

Subsequently, in a case that the residual is greater than cMax (in a case that the residual cannot be expressed only by prefixVal), the TU decoder 3024 further decodes suffixVal that satisfies the following relational expression.

suffixVal=abs_remainder[n]−cMax

Alternatively, the following may be used.

suffixVal=dec_abs_level−cMax

Specifically, in a case that suffixVal is present, the TU decoder 3024 decodes suffixVal from the coded data based on the binarization of Limited k-th order Exp-Golomb (EG(k)). The case where suffixVal is present is a case where the bit string of prefixVal of the TR code has a length of 6 (=maxPrefixValTR), that is, "111111". Here, the degree k is assumed to be cRiceParam, the variable maxPreExtLen is assumed to be 11, and the variable truncSuffixLen is assumed to be 15. Instead of being set equal to a fixed value (11), maxPreExtLen may be derived in accordance with the range log 2TransformRange of the transform coefficient.

In the present embodiment, for example, maxPreExtLen may be derived as follows.

maxPreExtLen=(32−6)−log 2TransformRange=26−log 2TransformRange

For example, in a case that log 2TransformRange is given by (Equation R-1) described below, maxPreExtLen may be derived as follows.

maxPreExtLen=extended_precision_processing_flag?26−Max(15,BitDepth+BDOFFSET):11

Here, maxPreExtLen and escapeLength respectively indicate the maximum values of the lengths of the exp portion and the escape portion in the EG(k) code. log 2TransformRange is a variable indicating the range of the coefficient in the transform processed by the inverse quantization and inverse transform processing unit 311.

Figure 19:
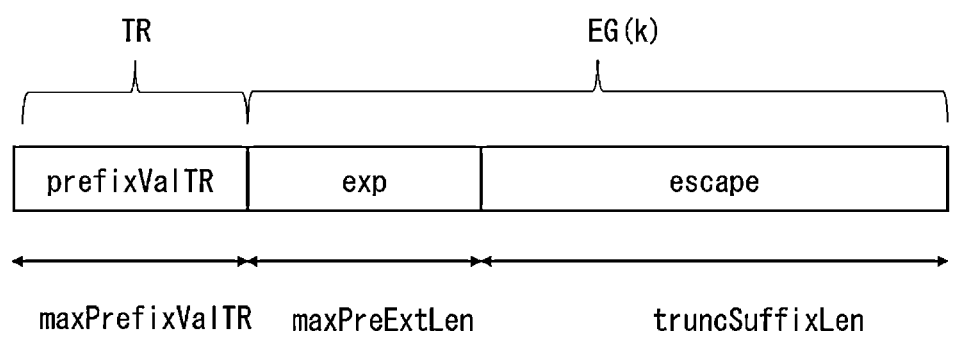
FIG. 19 is a diagram illustrating the bit-depth of binarization of a residual using a TR code and an EG(k) code.

FIG. 19 is a diagram illustrating a relationship between the codes of prefixValTR, maxPreExtLen, and truncSuffixLen. The residual code includes the prefix (prefixValTR) of the TR code and the suffix of the EG(k) code, and the suffix includes an exp portion and an escape portion. The lengths of prefixValTR and the escape portion are maxPrefixValTR and truncSuffixLen, respectively, and the maximum length of the exp portion is maxPreExtLen. In the following description, maxPrefixValTR=6 is assumed.

FIG. 20 is a diagram illustrating an example of the bit-depth and the code length of the syntax of the residual in a case that the precision in VVC and HEVC is not extended (log 2TransformRange==15). In this case, regardless of the bit-depth, the maximum length of binarization of the syntax remains unchanged and always has the same value. The sum of the maximum lengths is 32 (maxPrefixValTR+maxPreExtLen+truncSuffixLen=32), and thus the sum of the prefix and the suffix is less than or equal to 32.

FIG. 21 is a diagram illustrating an example of the bit-depth and the code length of the syntax of the residual in a case that the precision in HEVC is extended (log 2TransformRange>=15). In this configuration, truncSuffixLen is increased and maxPreExtLen is decreased in accordance with the bit-depth, and the sum of the maximum lengths of the residuals is maintained at a fixed value (32).

In another form, the TU decoder 3024 may derive maxPreExtLen based on a variable log 2CoeffRange different from the range log 2TransformRange of the transform coefficient. log 2CoeffRange is a variable indicating the range of the residual processed by the TU decoder 3024.

log 2CoeffRange=Max(15,BitDepth+3)

maxPreExtLen=(32−6)−log 2CoeffRange=26−log 2CoeffRange truncSuffixLen=log 2CoeffRange Binarization of Truncated Rice (TR) Code The input symbolVal for the TR binarization is prefixVal, and in the TR binarization, the quotient of symbolVal (==prefixVal) divided by (1<<cRiceParam) is coded as prefixValTR and the remainder is coded as suffixValTR. Note that the relationship between the input symbolVal of the TR code and prefixValTR is as follows.

prefixValTR=symbolVal>>cRiceParam prefixValTR is converted into a bit string in accordance with the following definition. In a case that prefixValTR< (cMax>>cRiceParam), the bit string is indexed by binIdx of the length of prefixValTR+1. In a case that binIdx<prefixValTR, the bins are "1". In a case that binIdx==prefixValTR, the bins are "0". Otherwise (prefixValTR==(cMax>>cRiceParam), the bit string is a string of "1" having a length of cMax>>cRiceParam. Note that the bins correspond to a bit string including "0" or "1". binIdx is a value indicating a position relative to the head of the bit string, and binIdx=0 corresponds to the head (the left end of the binary string).

An example of the bit string (bins) will be provided below in which prefixValTR is 0 to 5.

prefixValTR==0 bins=0 prefixValTR==1 bins=10 prefixValTR==2 bins=110 prefixValTR==3 bins=1110 prefixValTR==4 bins=11110 prefixValTR==5 bins=111110

. . .

Note that, in a case that symbolVal>=cMax (i.e., prefixVal==(6<<cRiceParam)), the following expression is established.

prefixValTR==6 bins=111111

The bins of prefixValTR of the TR code are truncated alpha codes (unary codes). Here, "truncated" means that the last 0 is omitted in a case that the bit string matches the maximum value.

In a case that cMax is greater than symbolVal (symbolVal<cMax) and that cRiceParam>0, then suffixTR of the TR bin string is present and is derived as described below. suffixValTR is the suffix of the TR bit string.

suffixValTR=symbolVal−(prefixValTR<<cRiceParam)

For the binarization of the suffix of the TR bit string, fixed-length binarization (described below) is used that has a maximum value cMaxFL of (1<<cRiceParam)−1.

Note that, in a case that symbolVal==cMax, the suffix of the residual is not suffixValTR of the TR binarization described above but uses the binarization of the EG(k) code.

Binarization of Limited k-Th Order Exp-Golomb/EG(k) Code suffixVal of the residual may use the binarization of the EG(k) code. The EG(k) code is a binarization obtained by using the order k (=cRiceParam) and maxPreExtLen as the inputs, and is expressed by the following pseudo code. The EG(k) code includes an exp portion with a length of maxPreExtLen or less and an escape portion of the fixed length binarization having a length of escapeLength. preExtLen is a variable that counts the number of put(1) in the exp portion and is equal to the value espVal coded in the exp portion. In other words, expVal=preExtLen. The value of the corresponding residual is expVal<<cRiceParam. escapeVal is a value coded in the escape portion.

```
// exp portion
codeValue = symbolVal >> k
preExtLen = 0
while((preExtLen < maxPreExtLen) && (codeValue >
((2 << preExtLen) − 2)))) {
    preExtLen ++
    put(1)
}
if(preExtLen == maxPreExtLen)
    escapeLength = truncSuffixLen
else {
    escapeLength = preExtLen + k
    put(0)
```

```
}
// escape portion
symbolVal = symbolVal − (((1 << preExtLen) − 1) << k)
while((escapeLength --) > 0)
    put((symbolVal >> escapeLength) & 1)
```

Here, symbolVal is an input value and is a value obtained by subtracting prefixVal (==cMax) from the residual. put(X) indicates an operation of adding X ("0" or "1") to the end of the bit string to create a bit string. The initial value of the bit string is empty ({ }). escapeLength is a variable indicating a bit position output from the escape portion in symbolVal. Note that the escape portion may be as follows.

symbolVal=symbolVal−(((2<<preExtLen)−2)<<k)

while((escapeLength--)>0)

put((symbolVal>>escapeLength) & 1)

Fixed-Length Binarization

The fixed-length binarization is performed on the maximum value cMaxFL and the value symbolVal by using an unsigned integer sequence (binary sequence) with a length fixedLength of Ceil(Log 2(cMaxFL+1)). Note that 0 at the position binIdx corresponds to the most significant bit (MSB) and that the distance to the least significant bit (LSB) decreases with increasing binIdx.

Conclusion of Decoding of Residual

The TU decoder 3024 decodes a residual including prefixVal and suffixVal.

The TU decoder 3024 derives cMax from cRiceParam, decodes prefixVal from the coded data with cMax as an upper limit, and in a case that suffixVal is present, decodes the suffixVal.

To be more specific, the TU decoder 3024 decodes prefixValTR of the TR binarization, and further decodes suffixValTR of the fixed-length binarization from the coded data in a case that symbolVal<cMax, cRiceParam>0 (that is, prefixVal<cMax, prefixVal<6). In this case, suffixVal is not present.

In a case that suffixVal is not present, the TU decoder 3024 derives abs_remainder[n] and dec_abs_level as follows.

abs_remainder[$n$]=(prefixValTR<<$c$RiceParam)+suffixValTR dec_abs_level[$n$]=(prefixValTR<<$c$RiceParam)+suffixValTR Otherwise (in a case that prefixVal==cMax and prefixValTR==6), the TU decoder 3024 decodes suffixVal using the EG(k) code, and derives abs_remainder[n] and dec_abs_level[n] as follows.

abs_remainder[$n$]=$c$Max+suffixVal dec_abs_level[$n$]=$c$Max+suffixVal

Here, in a case that suffixVal includes preExtLen of the exp portion of the EG(k) code and escapeVal of the escape portion of the EG(k) code, the following holds.

suffixVal=(preExtLen<<cRiceParam)+escapeVal

In conclusion, the TU decoder 3024 decodes, from the coded data, the prefix prefixVal of the TR binarization and suffixVal including preExtLen of the exp portion and escapeVal of the escape portion of the EG(k) code, and derives the residual (abs_remainder[n] or dec_abs_level[n]).

abs_remainder[n]=prefixVal+suffixVal=
 (prefixValTR<<cRiceParam)+(prefixValTR<
 6)?suffixValTR:(1<<expVal<<cRiceParam)+
 escapeVal Here, assuming preExtLen=escapeVal=0 in a case of (prefixValTR<6), abs_remainder[n]=(prefixValTR+preExtLen)<<cRi-
 ceParam+(prefixValTR<6)?suffixValTR:escape-
 Val dec_abs_level[n] is derived in a similar manner.

Note that a code obtained by concatenating bins of prefixValTR of the truncated alpha code and bins of predExtLen of the alpha code is also an alpha code and thus that prefixVal of the TR code and the exp portion of the EG(k) code may be decoded as an integrated portion. In this case, the alpha code having the maximum length maxPreExtLen+6 is read from the coded data, and the length prefixtmp (=prefixValTR+expVal) of the alpha code is decoded. Here, maxPreExtLen+6 is the sum of a maximum length of 6 of prefixValTR and the maximum length maxPreExtLen of the exp portion of the EG(k) code.

The TU decoder 3024 may derive the residual as follows, separating the quotient and remainder of 1<<cRiceParam.

Residual=(prefixRes<<cRiceParam)+suffixRes

In a case that the length of the decoded alpha code is prefixtmp, then the exp portion prefixRes of the residual is expressed as follows.

prefixRes=(prefixVal<6)?prefixValTR:prefixValTR+
 (1<<expVal)−1 prefixValTR=prefixtmp in a case that prefixtmp<6, and prefixValTR=6 and expVal=prefixtmp−6 in a case that prefixtmp>=6, and thus the derivation can be performed as follows.

For a configuration using prefixRes $$= (prefixtmp < 6)? prefixtmp: 6 + (1 \ll (prefixtmp - 6)) - 1$$

$$= (prefixtmp < 6)? prefixtmp: (1 \ll (prefixtmp - 6)) + 5$$

and
 prefixRes=(prefixVal<6) ? prefixValTR:prefixValTR+
 (2<<expVal)−2, the following may be employed.

$$prefixRes = (prefixtmp < 6)? prefixtmp: 6 + (2 \ll (prefixtmp - 6)) - 2$$

$$= (prefixtmp < 6)? prefixtmp: (2 \ll (prefixtmp - 6)) + 4$$

$$= (prefixtmp < 6)? prefixtmp: (1 \ll (prefixtmp - 5)) + 4$$

Here, prefixtmp<6 can also be processed by being treated as prefixtmp<5. Both suffixValTR and escapeVal are fixed-length binarization, so that suffixRes may be similarly decoded by setting fixedLength of cMaxFL for the former and setting fixedLength of the escapeLength length for the latter.

Quantized Transform Coefficient

The TU decoder 3024 sequentially decodes abs_remainder from the coded data for the position n, and derives the quantized transform coefficient AbsLevel from AbsLevelPass1 and abs_remainder as follows. n is any one of the coefficient positions less than or equal to the last coefficient position in the scan order in the sub-block, the coefficient positions being taken until a prescribed number of bits are decoded.

AbsLevel[xC][yC]=AbsLevelPass1[xC][yC]+2*abs_
 remainder[n]

Here, AbsLevelPass1[xC][yC]=sig_coeff_flag[xC]
 [yC]+par_level_flag[n]+abs_level_gtx_flag[n]
 [0]+2*abs_level_gtx_flag[n][1].

Otherwise (n indicates that a prescribed number of bits have been decoded), the TU decoder 3024 decodes dec_abs_level from the coded data and derives AbsLevel as follows.

if (dec_abs_level[n]==ZeroPos[n])

AbsLevel[xC][yC]=0 else if (dec_abs_level[n]<ZeroPos)

AbsLevel[xC][yC]=dec_abs_level[n]+1 else /*dec_abs_level[n]>ZeroPos[n]*/

AbsLevel[xC][yC]=dec_abs_level[n]

Here, ZeroPos is derived as follows.

ZeroPos[n]=(QState<2?1:2)<<cRiceParam

Here, QState indicates the state of dependent quantization.

Rice Parameter Derivation

For abs_remainder and dec_abs_level, included in the syntax elements representing the absolute values of the coefficients, values binarized by the Golomb-Rice code (or the Rice code) are decoded by a bypass code (equal probability code of CABAC). abs_remainder is a difference between the absolute value of the transform coefficient and offset, and dec_abs_level is the absolute value of the transform coefficient.

Note that, for the Golomb-Rice code, a syntax element is divided into two portions of a first half portion (prefix) and a second half portion (reminder or suffix) for coding. An alpha code (unary code) capable of coding a value close to 0 by using a short code amount is used for the prefix. The suffix uses fixed-length binarization using the Rice parameter cRiceParam or EG(k) binarization. A feature is that an increased Rice parameter increases a bit-depth of a small value, while reducing a bit-depth of a large value. The code amount can be reduced by adjusting the Rice parameter in accordance with the occurrence probability of the magnitude of the value of the syntax element.

According to the present embodiment, the video decoding apparatus and the video coding apparatus predict the value of the syntax element to be decoded from the absolute values of coefficients already derived. Then, an appropriate Rice parameter is derived from the prediction value. A detailed description will be given with reference to FIG. 17.

The upper left coordinates of the current TU are represented as (x0, y0), the current scan position is represented as (xC, yC), and the log 2 values of the width and height of the TU are represented as log 2TbWidth and log 2TbHeight, respectively. By using the position (x, y), an array storing the absolute values of the coefficients is represented as AbsLevel[x][y]. FIG. 17(*a*) illustrates the positions of decoded coefficients around a coefficient used to decode abs_remainder or dec_abs_level. In a case that a variable representing the sum of the absolute values of the surrounding coefficients is represented as locSumAbs, the TU decoder 3024 derives locSumAbs in RRC as follows.

```
locSumAbs = 0
if (xC < (1 << log2TbWidth) - 1) {
        locSumAbs += AbsLevel[xC + 1][yC]
        if (xC < (1 << log2TbWidth) - 2)
            locSumAbs += AbsLevel[xC + 2][yC]
        if (yC < (1 << log2TbHeight) - 1)
            locSumAbs += AbsLevel[xC+ 1][yC + 1]
}
if (yC < (1 << log2TbHeight) - 1) {
        locSumAbs += AbsLevel[xC][yC + 1]
        if (yC < (1 << log2TbHeight) - 2)
            locSumAbs += AbsLevel[xC][yC + 2]
}
locSumAbs0 = locSumAbs
locSumAbs = Clip3 (0, 31, locSumAbs - baseLevel * 5)
```

1) In a case that the coefficient position (xC+1, yC) is in the block (xC<(1<<log 2TbWidth)−1), the value of t1 (AbsLevel[xC+1][yC]) is added to locSumAbs.

2) In a case of 1) and further that the position (xC+2, yC) is in the block (xC<(1<<log 2TbWidth)−2), the value of t2 (AbsLevel[xC+2][yC]) is added to locSumAbs.

3) In a case of 1) and further that the position (xC+1, yC+1) is in the block (yC<(1<<log 2TbHeigh)−1), the value of t3 (AbsLevel[xC+1][yC+1]) is added to locSumAbs.

4) In a case that the position (xC, yC+1) is in the block (yC<(1<<log 2TbHeight)−1), the value of t4 (AbsLevel[xC][yC+1]) is added to locSumAbs.

5) In a case of 4) and further that the position (xC, yC+2) is in the block (yC<(1<<log 2TbHeight)−2), the value of t5 (AbsLevel[xC][yC+2]) is added to locSumAbs. locSumAbs calculated by the above processing is updated by the variable baseLevel and clip processing as follows.

locSumAbs=Clip3(0,31,locSumAbs−baseLevel*5)

Here, baseLevel may be 4 in a case that abs_remainder is decoded (tcoeff==0), and may be 0 in a case that dec_abs_level is decoded (tcoeff==1). tcoeff is a variable indicating whether the decoding target is abs_remainder or dec_abs_level.

The table illustrated in FIG. 17(b) is used to derive, from the derived locSumAbs, the Rice parameters used for decoding abs_remainder and dec_abs_level.

Although not illustrated, the TU decoder 3024 may derive the Rice parameter cRiceParam using an equation as follows, without using the table.

```
if (baseLevel != 0)
    cRiceParam = Max (0, floor (log2(15 * locSumAbs)) − 7)
else
    cRiceParam = Max(0, floor (log2 (9 * locSumAbs) + 20) − 5)
```

The equation used includes the sum of products with the sum locSumAbs of the surrounding transform coefficients and the logarithm to the base 2 as described above. Here, baseLevel !=0 indicates the use for decoding of abs_remainder, and baseLevel==0 below else indicates the use for decoding of dec_abs_level.

The TU decoder 3024 uses no surrounding decoded coefficients in TSRC, and always sets the Rice parameter cRiceParam equal to 1.

Derivation of Quantized Transform Coefficient and Dependent Quantization

The inverse quantization and inverse transform processing unit 311 performs inverse quantization on the transform coefficient. As quantization methods, two methods of scalar quantization and dependent quantization are provided. In a case of dependent quantization, the RRC unit 30241 may further perform a part of inverse quantization processing.

The inverse quantization and inverse transform processing unit 311 derives the linear scale value ls[x][y] in accordance with the quantization parameter qP, rectNonTsFlag, and the value of the quantization matrix m[ ][ ] as follows. The inverse quantization and inverse transform processing unit 311 switches the method of deriving ls[ ][ ] between a case where the dependent quantization is enabled and where the transform skip is disabled and the other cases.

```
if(sh_dep_quant_used_flag && !transform_skip_flag)
    ls[x][y] = (m[x][y] * levelScale[rectNonTsFlag][(qP + 1)%6]) << ((qP + 1)/6)
else
    ls[x][y] = (m[x][y] * levelScale[rectNonTsFlag][qP%6]) << (qP/6)
rectNonTsFlag = (transform_skip_flag == 0 && (((Log2 (nTbW) + Log2 (nTbH)) & 1)
    == 1)) ? 1 : 0
    bdShift1 = transform_skip_flag == 1 ? 10 : BitDepth + rectNonTsFlag + (((Log2 (nTbW)
    + Log2 (nTbH))/2) − 5 + sh_dep_quant_used_flag
```

Note that, in a case that the range of the coefficient is extended as described below, the derivation may be performed as follows.

$bd$Shift1=BitDepth+rectNonTsFlag+(((Log 2($nTbW$)+ Log 2($nTbH$))/2)+10−log 2TransformRange+ sh_dep_quant_used_flag Case of not being Dependent Quantization In a case that the quantization method is not the dependent quantization, the transform coefficient is uniquely derived from the quantized transform coefficient and the quantization parameter. For example, in FIG. 11 or FIG. 12, a transform coefficient value d is derived as follows.

TransCoeffLevel[$x$0][$y$0][$c$Idx][$xC$][$yC$]=AbsLevel [$xC$][$yC$]*(1−2*coeff_sign_flag[$n$]) <Equation TC_REGULAR>

$dz$[$xC$][$yC$]=TransCoeffLevel[$x$0][$y$0][$c$Idx][$xC$][$yC$]

$dnc$[$xC$][$yC$]=($dz$[$xC$][$yC$]*$ls$[$xC$][$yC$]+((1<<$bd$-Shift1)>>1))>>$bd$Shift1

$d$[$xC$][$yC$]=Clip3(CoeffMin,CoeffMax,$dnc$[$xC$][$yC$])

Here, AbsLevel is a quantized transform coefficient value, and ls and bdShift1 are parameters derived from the quantization parameter qP. CoeffMin and CoeffMax are a minimum value and a maximum value of clipping, respectively, and are derived as follows.

CoeffMin=−(1<log 2TransformRange)

CoeffMax=(1<<log 2TransformRange)−1 log 2TransformRange indicates the range of the transform coefficient. In a case of log 2TransformRange=15, CoeffMin=−(1<<15), CoeffMax=(1<<15)−1.

Depending on BitDepth, the range of the transform coefficient log 2TransformRange may be set as follows.

log 2TransformRange=extended_precision_processing_flag?Max(15, BitDepth+BDOFFSET):15    (Equation R-1)

Here, BDOFFSET is a fixed value for calculating the range of the transform coefficient, and is suitably 4, 5, 6, or the like. extended_precision_processing_flag is a flag indicating whether an extended range is used as the range of the transform coefficient. Note that hereinafter, a configuration example will be described in which BDOFFSET used for the range of the coefficient in the binarization of the transform coefficient residual is bdoffsetC, and BDOFFSET used for transform shift values bdShift1 and bdShift2 is bdoffsetT. Possible configurations include one in which BDOFFSET used for deriving CoeffMin and CoeffMax is bdoffsetC and one in which BDOFFSET is bdoffsetT.

Case of being Dependent Quantization

On the other hand, as illustrated in FIG. 11, the dependent quantization includes two quantizers with different levels. The parity of the intermediate values (AbsLevelPass1 and AbsLevel) of the quantized transform coefficients is used to switch among four states QState. Then, quantization and inverse quantization are performed in accordance with the QState. Note that quantization and inverse quantization (scaling) using the quantization parameter are separately performed.

$Q$State=$Q$StateTransTable[$Q$State][AbsLevelPass1[$xC$][$yC$]& 1]

TransCoeffLevel[x0][y0][cIdx][$xC$][$yC$]=(2*AbsLevel[$xC$][$yC$]−($Q$State>1?1:0))*(1−2*coeff_sign_flag[$n$])  <Equation TC_DQ>

$dz$[$xC$][$yC$]=TransCoeffLevel[x0][y0][cIdx][$xC$][$yC$]

$dnc$[$xC$][$yC$]=($dz$[$xC$][$yC$]*$ls$[$xC$][$yC$]+((1<<bdShift1)>>1))>>bdShift1

$d$[$xC$][$yC$]=Clip3(CoeffMin,CoeffMax,$dnc$[$xC$][$yC$])

Here, QState is a state, and QStateTransTable [ ][ ] is a table used for state transition, for example, QStateTransTable [ ][ ]={{0,2}, {2,0}, {1,3}, {3,1}}.

Without using QStateTransTable [ ][ ], QState may be derived as follows.

$Q$State=(32040>>(($Q$State<<2)+((AbsLevelPass1[$xC$][$yC$]& 1)<<1))) & 3

Even with the same AbsLevel, a different TransCoeffLevel (or d) is derived depending on the value of QState. QState is derived by referencing the last decoded quantized transform coefficient value, and thus (inverse) quantization with high coding efficiency using correlation between coefficients can be performed as compared to general scalar (inverse) quantization.

Inverse Transform

The inverse quantization and inverse transform processing unit 311 includes an inverse quantization unit 3111, an inverse transform processing unit 3112, and an inverse core transform processing unit 31123.

The inverse core transform processing unit 31123 performs vertical transform on the residual d[ ][ ] obtained.

$e$[$x$][$y$]=Σ(transMatrix[$y$][$j$]×$d$[$x$][$j$])($j$=0 ... $nTbS$−1)

The inverse core transform processing unit 31123 shifts and clips the first intermediate value e[x] [y] and derives a second intermediate value g[x] [y].

$g$[$x$][$y$]=Clip3(CoeffMin,CoeffMax,($e$[$x$][$y$]+64)>>7)

CoeffMin and CoeffMax are a minimum value and a maximum value of clipping, respectively.

The inverse core transform processing unit 31123 performs transform on the transform coefficient d[ ][ ] or the modified transform coefficient d[ ][ ] and derives a prediction error r[ ][ ] (S5).

$r$[$x$][$y$]=$E$(TransMatrix[$x$][$j$]×$g$[$j$][$y$])($j$=0 ... $nTbS$−1)

Then, shift depending on the bit depth (BitDepth) is performed on the r[ ][ ], and an error resSamples[ ][ ] having the same accuracy as a prediction image derived by the prediction image generation unit 308 is derived. For example, shift is expressed as follows.

resSamples[$x$][$y$]=($r$[$x$][$y$]+(1<<($bd$Shift2−1)))>>$bd$Shift2    (Equation BD-1)

Here, the derivation is performed with bdShift2=5+log 2TransformRange−BitDepth. For (Equation R-1), bdShift2=extended_precision_processing_flag ? (5+BDOFFSET): Max(20−BitDepth, 0)

Note that the above-described shift value bdShift2 is used in a case that both nTbW and nTH of the transform size are larger than 1, and that the shift value may otherwise be increased by 1 (in a case that either of nTbW or nTH of the transform size is 1).

Figure 18:
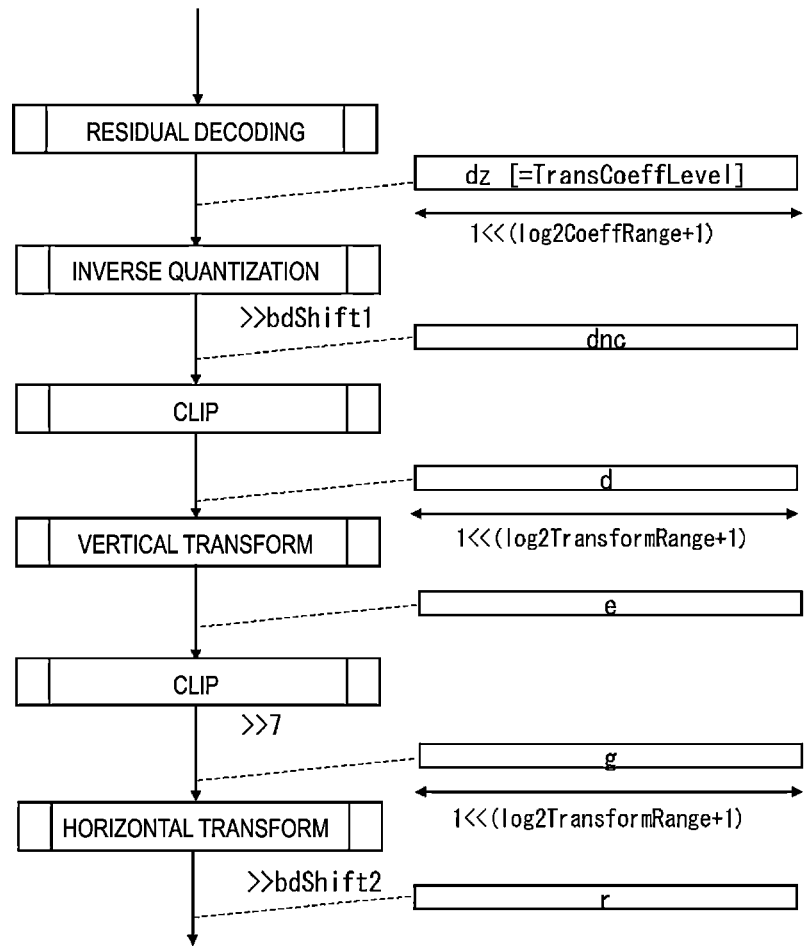
FIG. 18 is a diagram illustrating decoding, inverse quantization, and inverse transform processing of a residual.

$bd$Shift2=($nTbH$>1 && $nTbW$>1)?5+log 2TransformRange−BitDepth:6+log 2TransformRange−BitDepth FIG. 18 is a diagram illustrating processing of decoding, inverse quantization, and inverse transform of a residual. As described above, for the residual dz[ ], the TU decoder 3024 decodes a residual having a width of 1<<(log 2CoeffRange+1). The inverse quantization unit 3111 performs inverse quantization to obtain dnc [ ][ ]. The inverse quantization unit 3111 further performs right-shift by bdShift1, and limits the range of the variable to a width of 1<<(log 2TransformRange+1) by clipping to obtain d [ ][ ]. The inverse transform processing unit 3112 vertically transforms d [ ][ ], performs right-shift by 7, and limits the range of the variable to a width of 1<<(log 2TransformRange+1) by clipping to obtain g [ ][ ]. The inverse transform processing unit 3112 horizontally transforms g [ ][ ] obtained, and further performs right-shift by bdShift2 to obtain a difference image r [ ][ ]. In the embodiment described below, for a high depth, the transform precision is improved by reducing the number of shifts in bdShift1 and increasing the number of shifts in bdShift2, but the range of clipping needs to be widened accordingly. The width of the residual needs to be increased before the residual is input to transform. The embodiment described below is characterized by how the values of the range and the shift are set.

Embodiment 2

The prescribed range log 2CoeffRange is used to set the range (truncSuffixLen) of the transform coefficient in the coding of the residual and the range (CoeffMin, CoeffMax) of the transform coefficient in the transform of the residual. Then, the shift amounts bdShift1 and bdShift2 of the inverse transform in the inverse quantization and inverse transform processing unit 311 may be set by another variable log 2TransformRange.

FIG. 22 is a diagram illustrating the relationship between the bit-depth, the bit-depth of the syntax of the residual, and the shift lengths of inverse quantization (scaling)/inverse transform according to the present invention. FIG. 22($a$) is a diagram illustrating a method of deriving the lengths of the TR code and the EG(k) code, the range CoeffMin, CoeffMax of the transform coefficient in the inverse quantization and inverse transform, and the shift values bdShift1 and bdShift2. FIG. 22(b) is a diagram illustrating the code lengths of the TR code and the EG(k) code. FIG. 22(c) is a diagram illustrating an example of the code lengths of the TR code and the EG(k) code in accordance with the bit-depth in a case that log 2TransformRange corresponding to bdoffsetT=6 and bdoffsetC=3 are used.

To be more specific, the TU decoder 3024 may derive maxPreExtLen and truncSuffixLen based on log 2CoeffRange. In other words, the TU decoder 3024 may derive maxPreExtLen and truncSuffixLen based on a prescribed constant bdoffsetC. log 2TransformRange is a variable indicating a range related to the shift value of the transform coefficient, and log 2CoeffRange is a variable of an integer value indicating the range of the residual. bdoffsetC is a constant of an integer value, and is appropriately from 3 to 5.

log 2CoeffRange=Max(15,BitDepth+*bd*offsetC)

maxPreExtLen=(32−6)−log 2CoeffRange=26−log 2CoeffRange truncSuffixLen=log 2CoeffRange The inverse quantization and inverse transform processing unit 311 uses log 2CoeffRange to derive the minimum value CoeffMin and the maximum value CoeffMax used for clipping processing of the coefficient.

CoeffMin=−(1<<log 2CoeffRange)

CoeffMax=(1<<log 2CoeffRange)−1

In other words, the range (CoeffMin, CoeffMax) of the clipping processing used by the inverse quantization and inverse transform processing unit 311 is set equal to the maximum length (truncSuffixLen) of the exp portion.

By using log 2TransformRange based on a certain constant bdoffsetT as described above, the shift amounts bdShift1 and bdShift2 related to the intermediate precision of the transform used by the inverse quantization and inverse transform processing unit 311 are derived as follows.

*bd*Shift1=BitDepth+rectNonTsFlag+((Log 2(*nTbW*)+ Log 2(*nTbH*))/2)+10−log 2TransformRange+ sh_dep_quant_used_flag

*bd*Shift2=5+log 2TransformRange−BitDepth

Alternatively, the following equations may be used.

*bd*Shift2=(*nTbH*>1 && *nTbW*>1)?5+log 2Transform-Range−BitDepth:6+log 2TransformRange−Bit-Depth log 2TransformRange=Max(15,BitDepth+*bd*offsetT)

Here, bdoffsetT is a constant of an integer value, and is appropriately from 4 to 6.

In this configuration, log 2TransformRange>=log 2CoeffRange is more preferable. In other words, in a case that log 2CoeffRange and log 2TransformRange are respectively derived by the sum of the bit-depth and bdoffsetC and the sum of the bit-depth and bdoffsetT, bdoffsetT>bdoffsetC is satisfied. Alternatively, the above-described variable may be derived based on extended_precision_precision_flag as follows.

log 2TransformRange=extended_precision_processing_flag?Max (15,BitDepth+*bd*offsetT):15 log 2CoeffRange=extended_precision_processing_flag?Max (15,BitDepth+*bd*offsetC):15

As illustrated in FIG. 22(a), the TU decoder 3024 and the inverse quantization and inverse transform processing unit 311 according to the present embodiment derive maxPreExtLen, truncSufficLen, CoeffMin, CoeffMax, bdShift1, and bdShift2 as follows.

CoeffMin=−(1<<Max(15,BitDepth+*bd*offsetC))

CoeffMax=(1<<Max(15,BitDepth+*bd*offsetC))−1 maxPreExtLen==26−Max(15,BitDepth+*bd*offsetC)

truncSuffixLen=Max(15,BitDepth+*bd*offsetC)

*bd*Shift1=BitDepth+rectNonTsFlag+((Log 2(*nTbW*)+ Log 2(*nTbH*))/2)+10−Max(15,BitDepth+*NT*)+ sh_dep_quant_used_flag

*bd*Shift2=5+Max(15,BitDepth+*bd*offsetT)−BitDepth

Alternatively, the following equation may be used.

*bd*Shift2=(*nTbH*>1 && *nTbW*>1)?5+Max(15,Bit-Depth+*bd*offsetT)−BitDepth:6+Max(15,Bit-Depth+*bd*offsetT)−BitDepth For example, the following configuration with bdoffsetT=6 and bdoffsetC=3 may be employed.

log 2TransformRange=Max(15,BitDepth+6)

log 2CoeffRange=Max(15,BitDepth+3)

For example, the following configuration with bdoffsetT=5 and bdoffsetC=3 may be employed.

log 2TransformRange=Max(15,BitDepth+5)

log 2CoeffRange=Max(15,BitDepth+3)

In the above-described configuration, in which the variables bdShift1 and bdShift2, related to the precision of transform, are derived from log 2TransformRange, log 2CoeffRange can be set to be small relative to log 2TransformRange. Consequently, the configuration is effective in facilitating the processing while providing an effect of improving the coding efficiency by increasing the precision. In a case that the total value of the length of prefix of the TR code, maxPreExtLen, and truncSuffixLen is maintained at a prescribed value (here, 32), there is a problem in that an increase in truncSuffixLen reduces the maximum value of maxPreExtLen, preventing a large residual value from being efficiently expressed. In this configuration example, truncSuffixLen is set equal to log 2CoeffRange, which is a value relatively smaller than log 2TransformRange, to allow maxPreExtLen to be prevented from being smaller than expected. This is effective in improving the coding efficiency.

FIG. 23 is a diagram illustrating the relationship between the bit-depth, the bit length of the syntax of the residual, and the shift lengths of the inverse quantization and inverse transform in a configuration example of the present invention. FIG. 23(a) is a diagram illustrating a method of deriving the lengths of the TR code and the EG(k) code, and the range (CoeffMin, CoeffMax) and the shift values (bdShift1, bdShift2) of the transform coefficient in the inverse quantization and the inverse transform. FIG. 23(b) is a diagram illustrating code lengths of the TR code and the EG(k) code. FIG. 23(c) is a specific example of the code lengths of the TR code and the EG(k) code in accordance with the bit-depth in a case that log 2TransformRange and bdOffsetC corresponding to bdOffsetT=6 are used.

The TU decoder 3024 derives the range (truncSuffixLen) of the transform coefficient in the coding of the residual, based on a prescribed constant bdOffsetC. In other words, the TU decoder 3024 derives truncSuffixLen based on a variable log 2CoeffRange, which is different from log 2TransformRange.

log 2CoeffRange=Max(15,BitDepth+*bd*offsetC)

truncSuffixLen=log 2CoeffRange maxPreExtLen=26−truncSuffixLen

Based on a constant bdoffsetT different from the bdoffsetC, the TU decoder 3024 derives the range (CoeffMin, CoeffMax) of the transform coefficient in the transform and the shift amounts (bdShift1, bdShift2) in the inverse transform in the inverse quantization and inverse transform processing unit 311.

log 2TransformRange=Max(15,BitDepth+*bd*offsetT)

CoeffMin=−(1<<Max(15,BitDepth+*bd*offsetT))

CoeffMax=(1<<Max(15,BitDepth+*bd*offsetT)−1 log 2TransformRange is used as described above to derive the shift amounts bdShift1 and bdShift2 related to the intermediate precision of the transform used by the inverse quantization and inverse transform processing unit 311, as follows.

*bd*Shift1=BitDepth+rectNonTsFlag+((Log 2(*nTbW*)+Log 2(*nTbH*))/2)+10−log 2TransformRange+sh_dep_quant_used_flag

*bd*Shift2=5+log 2TransformRange−BitDepth

Alternatively, the following equation may be used.

*bd*Shift2=(*nTbH*>1 && *nTbW*>1)?5+log 2TransformRange−BitDepth:6+log 2TransformRange−BitDepth Here, bdoffsetT and bdoffsetC are the constants of integer values satisfying bdoffsetC<bdoffsetT, and bdoffsetC is appropriately from 3 to 5 and bdoffsetT is appropriately from 4 to 6. For example, bdoffsetC=3 and bdoffsetT=5 may be set. extended_precision_processing_flag may be decoded, and depending on the value of extended_precision_processing_flag decoded, the following derivation may be performed.

log 2TransformRange=extended_precision_processing_flag?Max(15,BitDepth+*bd*offsetT):15 log 2CoeffRange=extended_precision_processing_flag?Max(15,BitDepth+*bd*offsetC):15

Note that, as described below, sps_residual_extension_flag may be decoded, and depending on the value of sps_residual_extension_flag decoded, whether log 2CoeffRange is set equal to log 2TransformRange may be switched.

log 2TransformRange=sps_residual_extension_flag?Max(15,BitDepth+*bd*offsetC):Max(15,BitDepth+*bd*offsetT)

In the above-described configuration, even with an increase in log 2TransformRange, the variable related to maxPreExtLen is set equal to log 2CoeffRange to allow maxPreExtLen to be prevented from being smaller than expected, while improving the transform precision. This is effective in improving the coding efficiency. log 2TransformRange is a variable related to the precision of the transform, and depends on bdShift1 and bdShift2.

Embodiment 3

FIG. 24 is a diagram illustrating the relationship between the bit-depth, the bit-depth of the syntax of the residual, and the shift lengths of the inverse quantization and inverse transform according to the present invention.

In this configuration, the total value of prefixTR, maxPreExtLen, and truncSuffixLen is set equal to a fixed value (32) as in the Embodiment 1. In the present embodiment, however, truncSuffixLen is limited to maxSuffix or less as illustrated in FIG. 24(*c*). This prevents the value of maxPreExtLen from being smaller than a prescribed value.

To be more specific, the TU decoder 3024 derives truncSuffixLen, CoeffMin, CoeffMax, bdShift1, and bdShift2 based on log 2TransformRange, and further derives truncSuffixLen based on the maximum value of truncSuffixLen. truncSuffixLen is the range of the transform coefficient in the coding of the residual. CoeffMin and CoeffMax correspond to the range of the transform coefficient in the transform. bdShift1 and bdShift2 are the shift amounts in the inverse transform in the inverse quantization and inverse transform processing unit 311.

log 2TransformRange=Max(15,BitDepth+*bd*offsetT)

CoeffMin=−(1<<Max(15,BitDepth+*bd*offsetT))

CoeffMax=(1<<Max(15,BitDepth+*bd*offsetT))−1 truncSuffixLen=Min(log 2TransformRange,maxSuffix)

maxPreExtLen=26−truncSuffixLen

Here, maxSuffix is the maximum value of the truncSuffixLen, and may be an integer of 20 or less. bdOffsetT may be an integer value from 4 to 6.

Note that, as described below, sps_residual_extension_flag, which is a syntax element in the coded data, may be decoded, and depending on the value of sps_residual_extension_flag decoded, whether to limit the value of truncSuffixLen may be switched.

truncSuffixLen=sps_residual_extension_flag?Min(log 2TransformRange,maxSuffix):log 2TransformRange log 2TransformRange is used as described above to derive the shift amounts bdShift1 and bdShift2 related to the intermediate precision of the transform used by the inverse quantization and inverse transform processing unit 311, as follows.

*bd*Shift1=BitDepth+rectNonTsFlag+((Log 2(*nTbW*)+Log 2(*nTbH*))/2)+10−log 2TransformRange+sh_dep_quant_used_flag

*bd*Shift2=5+log 2TransformRange−BitDepth

Alternatively, the following equation may be used.

*bd*Shift2=(*nTbH*>1 && *nTbW*>1)?5+log 2TransformRange−BitDepth:6+log 2TransformRange−BitDepth According to the above-described configuration, even with an increase in log 2TransformRange, truncSuffixLen is limited to maxSuffix or less. Consequently, maxPreExtLen is limited to 26−maxSuffix or more. Therefore, the maxPreExtLen can be prevented from being smaller than expected. This is effective in improving the coding efficiency. log 2TransformRange is a variable related to the precision of the transform, and depends on bdShift1 and bdShift2.

Embodiment 4A

FIG. 25 is a diagram illustrating the relationship between the bit-depth, the bit-depth of the syntax of the residual, and the shift lengths of the inverse quantization and inverse transform according to the present invention.

In the present embodiment, a configuration may be used in which the total value of the length of the prefix, maxPreExtLen, and truncSuffixLen of the binarization processing of the Truncated Rice (TR) code is not set equal to a prescribed value (here, 32).

To be more specific, as illustrated in FIG. 25(c), the TU decoder 3024 sets maxPreExtLen equal to a fixed value (11). Then, the range (truncSuffixLen) of the transform coefficient in the coding of the residual, the range (CoeffMin, CoeffMax) of the transform coefficient in the transform, and the shift amounts bdShift1 and bdShift2 of the inverse transform in the inverse quantization and inverse transform processing unit 311 are derived based on log 2TransformRange.

log 2TransformRange=Max(15,BitDepth+$bd$offset$T$)

CoeffMin=−(1<<log 2TransformRange))

CoeffMax=(1<<log 2TransformRange)−1 maxPreExtLen=11 truncSuffixLen=log 2TransformRange bdoffsetT can be an integer value from 4 to 6.

Note that the value of maxPreExtLen is not limited to 11, and may be a value from 6 to 11.

By using log 2TransformRange as described above, bdShift1 and bdShift2 are derived as follows.

$bd$Shift1=BitDepth+rectNonTsFlag+((Log 2($nTbW$)+
Log 2($nTbH$))/2)+10−log 2TransformRange+
sh_dep_quant_used_flag $bd$Shift2=5+log 2TransformRange−BitDepth Alternatively, the following equation may be used.

$bd$Shift2=($nTbH$>1 && $nTbW$>1)?5+log 2Transform-
Range−BitDepth:6+log 2TransformRange−Bit-
Depth Note that, as described below, sps_residual_extension_flag, which is a syntax element in the coded data, may be decoded, and depending on the value of sps_residual_extension_flag decoded, whether maxPreExtLen is set equal to a fixed value may be switched.

maxPreExtLen=sps_residual_extension_flag?26−log
2TransformRange:11

The meaning expressed by the syntax element may be opposite.

maxPreExtLen=sps_residual_extension_flag?11:26−
log 2TransformRange

Note that the fixed value is not limited to 11 and may be any value from 6 to 11 and that the value may be switched depending on sps_residual_extension_flag.

maxPreExtLen=sps_residual_extension_flag?7:11

In this configuration, the total value of the length of the prefix of the TR code, maxPreExtLen, and truncSuffixLen is not limited to a fixed value. In this case, even with an increase in truncSuffixLen derived by log 2TransformRange, the value of maxPreExtLen is fixed and prevented from being smaller. Accordingly, maxPreExtLen can be prevented from being smaller than expected due to an increase in the variable log 2TransformRange. This is effective in improving the coding efficiency.

Embodiment 4B

FIG. 26 is a diagram illustrating the relationship between the bit-depth, the bit-depth of the syntax of the residual, and the shift lengths of the inverse quantization and inverse transform according to the present invention.

A configuration will be described in which the total value of the length of the prefix of the Truncated Rice (TR) code, maxPreExtLen, and truncSuffixLen is not set equal to a fixed value (here, 32). As illustrated in FIG. 26(b), instead of setting maxPreExtLen equal to 26−log 2TransformRange, this configuration sets the minimum value of the maxPreExtLen value equal to minExtLen by clipping of the values.

To be more specific, based on log 2TransformRange, the TU decoder 3024 derives the range (truncSuffixLen) of the transform coefficient in the coding of the residual, the range (CoeffMin, CoeffMax) of the transform coefficient in the transform, and the shift amounts bdShift1 and bdShift2 in the inverse transform in the inverse quantization and inverse transform processing unit 311. Furthermore, the TU decoder 3024 sets the minimum value of maxPreExtLen equal to minExtLen, and the derivation can be performed as follows.

log 2TransformRange=Max(15,BitDepth+$bd$offset$T$)

CoeffMin=−(1<<log 2TransformRange))

CoeffMax=(1<<log 2TransformRange)−1 truncSuffixLen=log 2TransformRange maxPreExtLen=Max(minPreExt,26−log 2Transform-
Range)

Here, minPreExt can be an integer equal to or greater than 4. bdoffsetT can be an integer value from 4 to 6.

The above-described configuration is equivalent to the following configuration in which maxSuffix=26−minPreExt, and will be described with reference to FIG. 27.

maxPreExtLen=26−Min(log 2TransformRange,
maxSuffix)

The shift amounts bdShift1 and bdShift2 used in the inverse quantization and inverse transform processing unit 311 are derived by using log 2TransformRange as described above, as follows.

$bd$Shift1=BitDepth+rectNonTsFlag+((Log 2($nTbW$)+
Log 2($nTbH$))/2)+10−log 2TransformRange+
sh_dep_quant_used_flag $bd$Shift2=5+log 2TransformRange−BitDepth Alternatively, the following equation may be used.

$bd$Shift2=($nTbH$>1 && $nTbW$>1)?5+log 2Transform-
Range−BitDepth:6+log 2TransformRange−Bit-
Depth Note that, as described below, sps_residual_extension_flag may be decoded, and depending on the value of sps_residual_extension_flag decoded, whether to limit maxPreExtLen may be switched.

maxPreExtLen=sps_residual_extension_flag?Max
(minPreExt,26−log 2TransformRange):26−log
2TransformRange According to the above-described configuration, even in a case that log 2TransformRange increases in accordance with the bit-depth, maxPreExtLen is limited to the minimum value minPreExt or more. Accordingly, even in a case that the bdShift1 is decreased and the bdShift2 is increased in accordance with the bit-depth, maxPreExtLen can be prevented from being smaller than expected. This is effective in improving the coding efficiency.

Another Example of Embodiment 4B

FIG. 27 is a diagram illustrating the relationship between the bit-depth, the bit-depth of the syntax of the residual, and the shift lengths of the inverse quantization and the inverse transform according to the present invention.

A configuration will be described in which the total value of the length of the prefix of the Truncated Rice (TR) code, maxPreExtLen, and truncSuffixLen is not set equal to a fixed value (here, 32). In this embodiment, the TU decoder 3024 may derive maxPreExtLen based on log 2CoeffRange. As illustrated in FIG. 27(*a*), truncSuffixLen of the escape portion of the residual is derived in accordance with log 2TransformRange, and the maximum value maxPreExtLen of the exp portion of the residual is derived by clip processing. log 2TransformRange is a variable related to the precision of the transform and the range of the transform coefficient.

Based on log 2TransformRange, the TU decoder 3024 derives the range (truncSuffixLen) of the transform coefficient in the coding of the residual, the range (CoeffMin, CoeffMax) of the transform coefficient in the transform, and the shift amounts bdShift1 and bdShift2 of inverse transform in the inverse quantization and inverse transform processing unit 311. Here, with the minimum value of the variable maxPreExtLen set equal to minExtLen, the derivation can be performed as follows.

log 2TransformRange=Max(15,BitDepth+*bd*offset*T*)

CoeffMin=−(1<<log 2TransformRange))

CoeffMax=(1<<log 2TransformRange)−1 maxPreExtLen=26−Min(log 2TransformRange,
maxSuffix)

truncSuffixLen=log 2TransformRange

Here, maxSuffix can be an integer equal to or less than 20. bdoffsetT can be an integer value from 4 to 6.

The shift amounts bdShift1 and bdShift2 used in the inverse quantization and inverse transform processing unit 311 are derived by using log 2TransformRange as described above, as follows.

*bd*Shift1=BitDepth+rectNonTsFlag+((Log 2(*nTbW*)+
Log 2(*nTbH*))/2)+10−log 2TransformRange+
sh_dep_quant_used_flag

*bd*Shift2=5+log 2TransformRange−BitDepth

Alternatively, the following equation may be used.

*bd*Shift2=(*nTbH*>1 && *nTbW*>1)?5+log 2Transform-
Range−BitDepth:6+log 2TransformRange−Bit-
Depth Note that, as described below, sps_residual_extension_flag, which is a syntax element in the coded data, may be decoded, and depending on the value of sps_residual_extension_flag decoded, whether to limit maxPreExtLen may be switched.

maxPreExtLen=sps_residual_extension_flag?26−Min
(log 2TransformRange,maxSuffix):26−log
2TransformRange According to the above-described configuration, even in a case that log 2TransformRange increases in accordance with the bit-depth, the maxPreExtLen is limited to the minimum value minPreExt or more. Accordingly, even in a case that the bdShift1 is decreased and the bdShift2 is increased in accordance with the bit-depth, maxPreExtLen can be prevented from being smaller than expected. This is effective in improving the coding efficiency. log 2TransformRange is a variable related to the precision of transform, and depends on bdShift1 and bdShift2.

Embodiment 4C

FIG. 28 is a diagram illustrating the relationship between the bit-depth, the bit-depth of the syntax of the residual, and the shift lengths of inverse quantization and inverse transform according to the present invention.

A configuration will be described in which the total value of the length of the prefix of the Truncated Rice (TR) code, maxPreExtLen, and truncSuffixLen is not set equal to a fixed value (here, 32). In the present embodiment, the TU decoder 3024 may derive maxPreExtLen based on log 2CoeffRange. As illustrated in FIG. 28(*a*), truncSuffixLen of the escape portion of the residual is derived in accordance with log 2TransformRange, but the maximum value maxPreExtLen of the exp portion of the residual is derived in accordance with log 2CoeffRange.

To be more specific, log 2CoeffRange is used to set the range (truncSuffixLen) of the transform coefficient in the coding of the residual, and log 2TransformRange is used to derive the shift amounts bdShift1 and bdShift2 of the inverse transform in the inverse quantization and inverse transform processing unit 311, as follows.

log 2TransformRange=Max(15,BitDepth+*bd*offset*T*)

CoeffMin=−(1<<log 2TransformRange)

CoeffMax=(1<<log 2TransformRange)−1 log 2CoeffRange=Max(15,BitDepth+*bd*offest*C*)

maxPreExtLen=26−log 2CoeffRange truncSuffixLen=log 2TransformRange bdoffsetT can be an integer value from 4 to 6. bdoffsetC is a variable less than bdoffsetT.

The shift amounts bdShift1 and bdShift2 used in the inverse quantization and inverse transform processing unit 311 are derived by using log 2TransformRange as described above, as follows.

*bd*Shift1=BitDepth+rectNonTsFlag+((Log 2(*nTbW*)+
Log 2(*nTbH*))/2)+10−log 2TransformRange+
sh_dep_quant_used_flag

*bd*Shift2=5+log 2TransformRange−BitDepth

Alternatively, the following equation may be used.

*bd*Shift2=(*nTbH*>1 && *nTbW*>1)?5+log 2Transform-
Range−BitDepth:6+log 2TransformRange−Bit-
Depth Note that, as described below, which of log 2TransformRange and log 2CoeffRange is used to derive maxPreExtLen may be switched depending on the value of sps_residual_extension_flag.

maxPreExtLen=sps_residual_extension_flag?26−log 2CoeffRange:26−log 2TransformRange According to the above-described configuration, even in a case that log 2TransformRange increases in accordance with the bit-depth, maxPreExtLen can be derived from log 2CoeffRange, which is smaller than log 2TransformRange. Even in a case that bdShift1 is decreased and bdShift2 is increased in accordance with the bit-depth, maxPreExtLen can be prevented from being smaller than expected. This is effective in improving the coding efficiency.

Embodiment 5

In the present embodiment, the range log 2TransformRange itself of the transform coefficient is limited to a certain value maxCoeffRange or less to prevent the range related to the truncSuffixLen from being excessively large.

To be more specific, the TU decoder 3024 sets the range (log 2TransformRange) of the transform coefficient by using the sum of the bit-depth and a prescribed constant bdoffsetT, but limits the range to a prescribed value maxCoeffRange or less.

log 2TransformRange=Min(Max(15,BitDepth+$bd$offsetT),maxCoeffRange)

CoeffMin=−(1<<log 2TransformRange)

CoeffMax=(1<<log 2TransformRange)−1 maxPreExtLen=26−log 2TransformRange)

truncSuffixLen=log 2TransformRange

Here, bdoffsetT may be an integer value from 4 to 6, and maxCoeffRange may be from 18 to 20. Note that the calculation may be performed with the order of Min and Max changed, or a Clip3 function may be used.

log 2TransformRange=Max(15,Min BitDepth+$bd$offsetT,maxCoeffRange))

log 2TransformRange=Clip3(15,maxCoeffRange, BitDepth+$bd$offsetT)

The shift amounts bdShift1 and bdShift2 used in the inverse quantization and inverse transform processing unit 311 are derived by using log 2TransformRange as described above, as follows.

$bd$Shift1=BitDepth+rectNonTsFlag+((Log 2($nTbW$)+Log 2($nTbH$))/2)+10−log 2TransformRange+sh_dep_quant_used_flag $bd$Shift2=5+log 2TransformRange−BitDepth Alternatively, the following equation may be used.

$bd$Shift2=($nTbH$>1 && $nTbW$>1)?5+log 2TransformRange−BitDepth:6+log 2TransformRange−BitDepth For example, bdoffsetT=5 and maxCoeffRange=20 are preferable. CoeffMin, CoeffMax, bdShift1, and bdShift2 are also set as described above.

log 2TransformRange=Min(Max(15,BitDepth+5),20)

The following setting in accordance with extended_precision_processing_flag is also preferable. In this example, in a case that bitDepth=10, the TU decoder 3024 switches log 2TransformRange between 16 or 15 depending on extended_precision_processing_flag.

log 2TransformRange=extended_precision_processing_flag?Min (Max(15,BitDepth+6),20):15

In the above-described configuration, in which log 2TransformRange increases in accordance with the bit-depth and maxPreExtLen is set in accordance with log 2TransformRange, the maximum value of log 2TransformRange is limited to maxCoeffRange or less. Thus, even in a case that bdShift1 is decreased and bdShift2 is increased in accordance with the bit-depth, maxPreExtLen can be prevented from being smaller than expected. This is effective in improving the coding efficiency.

Regardless of the above description, the header decoder and the TU decoder 3024 may transmit the parameter for each sequence. The parameter may be transmitted for each picture or for each slice. In this way, by transmitting the appropriate parameter corresponding to the state such as a sequence, a picture, or a slice, a prediction value is less likely to deviate from the original value (the absolute value of the coefficient to be decoded). This is effective in improving the coding efficiency.

The inverse quantization and inverse transform processing unit 311 performs scaling (inverse quantization) on a quantized transform coefficient received from the entropy decoder 301 to obtain the transform coefficient d [ ][ ]. The quantized transform coefficient is a coefficient obtained by performing, in coding processing, a transform such as a Discrete Cosine Transform (DCT) or a Discrete Sine Transform (DST) on prediction errors for quantization. In a case that transform_skip_flag is 0, the inverse quantization and inverse transform processing unit 311 performs an inverse frequency transform such as an inverse DCT or an inverse DST on the scaled transform coefficient d [ ][ ] to calculate the prediction error res [ ][ ]. In a case that transform_skip_flag is 1, the inverse quantization and inverse transform processing unit 311 sets res [x][y]=d [x][y]. The inverse quantization and inverse transform processing unit 311 outputs the prediction error to the addition unit 312.

Note that the inverse transform and the transform are opposite processing, and thus the transform and the inverse transform may be replaced with each other for interpretation. Alternatively, the transform may be referred to as forward transform in a case that the inverse transform is referred to as transform. For example, the non-discrete transform may be referred to as forward non-discrete transform in a case that the inverse non-discrete transform is referred to as non-discrete transform. The discrete transform is simply referred to as transform.

The addition unit 312 adds the prediction image of the block input from the prediction image generation unit 308 and the prediction error input from the inverse quantization and inverse transform processing unit 311 for each pixel, and generates a decoded image of the block. The addition unit 312 stores the decoded image of the block in the reference picture memory 306, and also outputs it to the loop filter 305.

Configuration of Video Coding Apparatus

Figure 16:
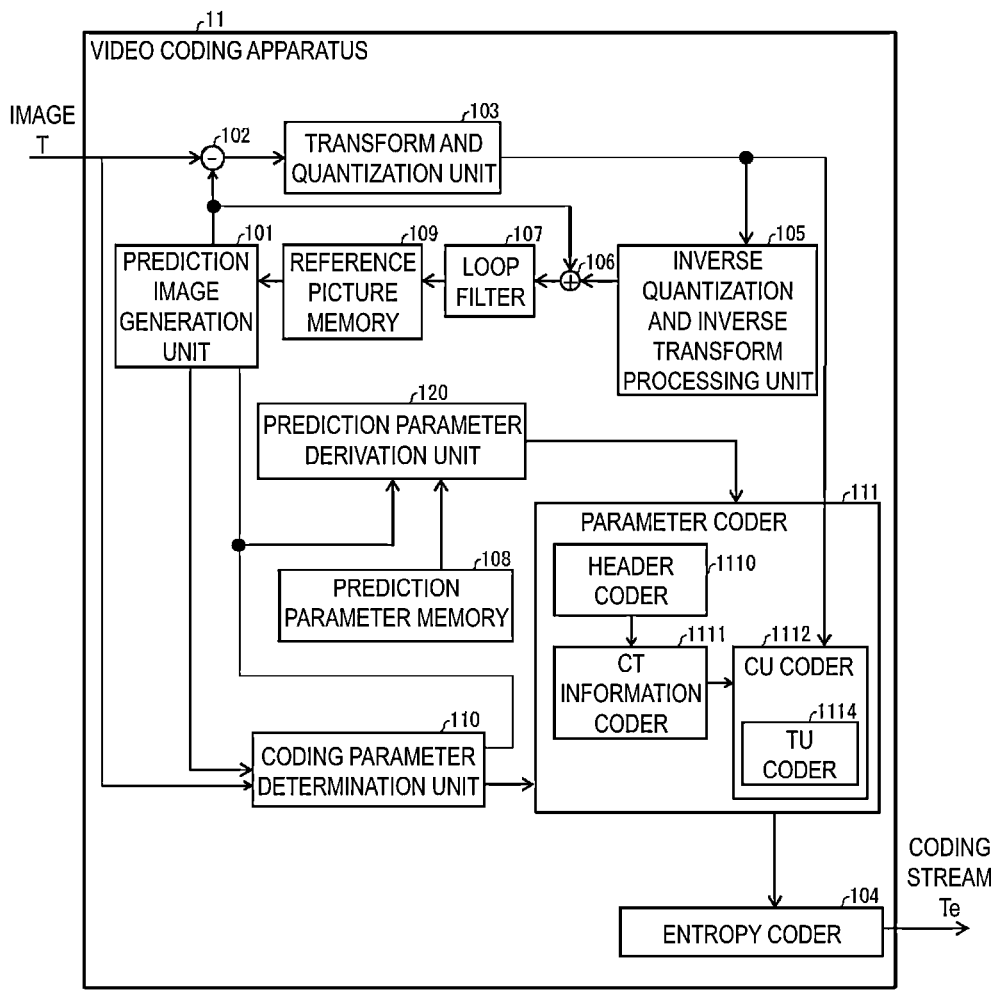
FIG. 16 is a block diagram illustrating a configuration of a video coding apparatus.

Next, a configuration of the video coding apparatus 11 according to the present embodiment will be described. FIG. 16 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory (a prediction parameter storage unit, a frame memory) 108, a reference picture memory (a reference image storage unit, a frame memory) 109, a coding parameter determination unit 110, a parameter coder 111, and an entropy coder 104.

The prediction image generation unit 101 generates a prediction image for each CU that is a region obtained by splitting each picture of an image T. The operation of the prediction image generation unit 101 is the same as that of the prediction image generation unit 308 already described, and description thereof will be omitted.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantized transform coefficient by quantization. The transform and quantization unit 103 outputs the quantized transform coefficient to the entropy coder 104 and the inverse quantization and inverse transform processing unit 105.

The inverse quantization and inverse transform processing unit 105 is the same as the inverse quantization and inverse transform processing unit 311 (FIG. 10) in the video decoding apparatus 31, and descriptions thereof are omitted. The calculated prediction error is output to the addition unit 106.

To the entropy coder 104, the quantized transform coefficient is input from the transform and quantization unit 103, and coding parameters are input from the parameter coder 111. The coding parameters include, for example, predMode indicating a prediction mode. predMode may be either MODE_INTRA indicating intra prediction or MODE_INTER indicating inter prediction, or may be MODE_INTRA, MODE_INTER, or MODE_IBC indicating intra block copy prediction in which a block in a picture is copied and used as a prediction image.

The entropy coder 104 performs entropy coding on the split information, the prediction parameter, the quantized transform coefficient, and the like, and generates and outputs the coding stream Te.

The parameter coder 111 includes a header coder 1110, a CT information coder 1111, a CU coder 1112 (prediction mode coder), an inter prediction parameter coder 112, and an intra prediction parameter coder 113 (not illustrated). The CU coder 1112 further includes a TU coder 1114.

General operation of each module will be described below. The parameter coder 111 performs coding processing of parameters such as header information, split information, prediction information, and quantized transform coefficients.

The CT information coder 1111 codes the QT and MT (BT, TT) split information and the like from the coded data.

The CU coder 1112 codes the CU information, the prediction information, the TU split flag, the CU residual flag, and the like.

In a case that the TU includes a prediction error, the TU coder 1114 codes the QP update information and the quantized transform coefficient. The TU coder 1114 codes the residual with the TR code and the EG(k) code as described for the TU decoder 3024. In other words, syntax elements (abs_remainder, dec_abs_level) are coded that are used for the TR code and the EG(k) code and that indicate the absolute value of the residual. For a method of deriving the Rice parameter used in coding, the maximum value of the prefix of the TR code, the maximum length maxPreExtLen of the exp portion, and the length truncSuffixLen of the escape portion, any of the methods described for the image decoding apparatus is used. The transform and quantization unit 103 and the inverse quantization and inverse transform processing unit 105 can also use the values of CoeffMin, CoeffMax, bdShift1, and bdShift2 as described for the image decoding apparatus.

The CT information coder 1111 and the CU coder 1112 supply, to the entropy coder 104, syntax elements such as the inter prediction parameter, the intra prediction parameter, and the quantized transform coefficient.

The addition unit 106 adds a pixel value of the prediction image of the block input from the prediction image generation unit 101 and the prediction error input from the inverse quantization and inverse transform processing unit 105 to each other for each pixel, and generates a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters, and may have a configuration of only the deblocking filter, for example.

The SAO is a filter that adds an offset corresponding to a classification result on a per-sample basis, and the ALF is a filter that uses the sum of products of the transmitted filter coefficient and the reference image (or the difference between the reference image and the target pixel).

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include QT, BT, or TT split information described above, a prediction parameter, or a parameter to be coded which is generated related thereto. The prediction image generation unit 101 generates the prediction image by using these coding parameters.

The coding parameter determination unit 110 calculates, for each of the multiple sets, an RD cost value indicating the magnitude of an amount of information and a coding error. The coding parameter determination unit 110 selects a set of coding parameters of which cost value calculated is a minimum value. In this manner, the entropy coder 104 outputs a set of selected coding parameters as the coding stream Te. The coding parameter determination unit 110 stores the determined coding parameters in the prediction parameter memory 108.

Note that, some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy coder 104, the inverse quantization and inverse transform processing unit 105, the loop filter 107, the coding parameter determination unit 110, and the parameter coder 111, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. A "computer-readable recording medium" refers to a portable medium such as a flexible disk, a magneto-optical disk, a ROM, and a CD-ROM, and a storage device such as a hard disk built into the computer system. Moreover, the "computer-readable recording medium" may include a medium that dynamically retains the program for a short period of time, such as a communication wire that is used to transmit the program over a network such as the Internet or over a communication line such as a telephone line, and a medium that retains the program for a certain period of time, such as a volatile memory within the computer system which functions as a server or a client in a case that the program is transmitted via the communication wire. Furthermore, the aforementioned program may be configured to implement part of the functions described above, and also may be configured to be capable of implementing the functions described above in combination with a program already recorded in the computer system.

Furthermore, a part or all of the video coding apparatus 11 and the video decoding apparatus 31 in the embodiments described above may be realized as an integrated circuit such as a Large Scale Integration (LSI). Each function block of the video coding apparatus 11 and the video decoding apparatus 31 may be individually realized as processors, or part or all may be integrated into processors. A circuit integration technique is not limited to the LSI, and may be implemented with a dedicated circuit or a general-purpose processor. Furthermore, in a case that advances in semiconductor technology lead to the advent of a circuit integration technology that replaces an LSI, an integrated circuit based on the circuit integration technology may be used.

The embodiment of the present invention has been described in detail above referring to the drawings, but the specific configuration is not limited to the above embodiment and various amendments can be made to a design that fall within the scope that does not depart from the gist of the present invention.

Application Examples

The above-mentioned video coding apparatus 11 and the video decoding apparatus 31 can be utilized being installed to various apparatuses performing transmission, reception, recording, and reconstruction of videos. Note that, the video may be a natural video imaged by camera or the like, or may be an artificial video (including CG and GUI) generated by computer or the like.

First, referring to FIG. 2, it will be described that the above-mentioned video coding apparatus 11 and the video decoding apparatus 31 can be utilized for transmission and reception of videos.

Figure 2:
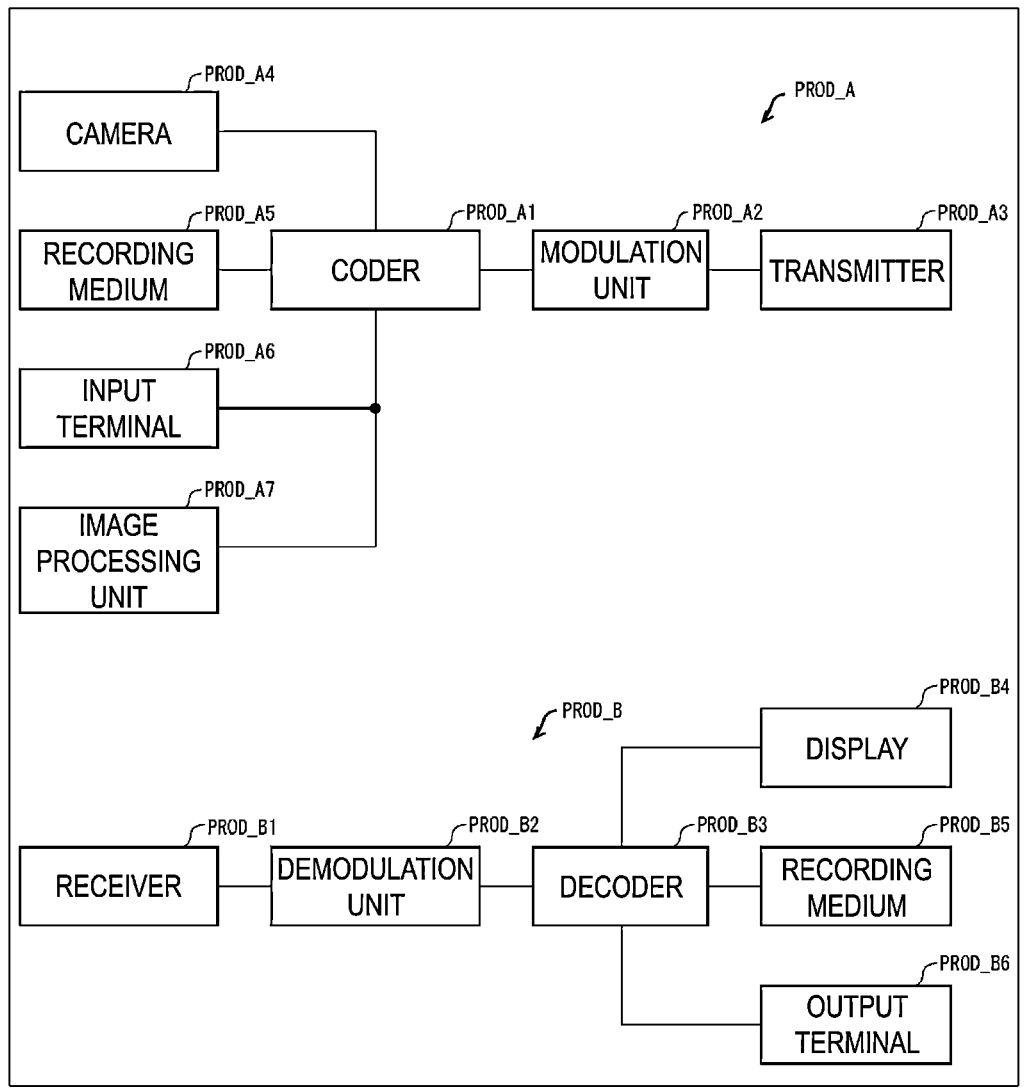
FIG. 2 is a diagram illustrating configurations of a transmission apparatus equipped with a video coding apparatus and a reception apparatus equipped with a video decoding apparatus according to the present embodiment. PROD_A illustrates the transmission apparatus equipped with the video coding apparatus, and PROD_B illustrates the reception apparatus equipped with the video decoding apparatus.

FIG. 2 illustrates a block diagram illustrating a configuration of a transmission apparatus PROD_A installed with the video coding apparatus 11. As illustrated in FIG. 2, the transmission apparatus PROD_A includes a coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmission apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the coder PROD_A1. Although an example configuration in which the transmission apparatus PROD_A includes all of the constituents is illustrated in the diagram, some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

FIG. 2 illustrates a block diagram illustrating a configuration of a reception apparatus PROD_B installed with the video decoding apparatus 31. As illustrated in the diagram, the reception apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The reception apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the reception apparatus PROD_B includes all of the constituents is illustrated in the diagram, some of the constituents may be omitted.

Note that the recording medium PROD_B5 may record videos which are not coded, or may record videos which are coded in a coding scheme for recording different from a coding scheme for transmission. In the latter case, a coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. A transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmission apparatus PROD_A/reception apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmission apparatus PROD_A/reception apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmission apparatus PROD_A/reception apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. Smartphones also include a multifunctional mobile telephone terminal.

Note that a client of a video hosting service has a function of coding a video imaged with a camera and uploading the video to a server, in addition to a function of decoding coded data downloaded from a server and displaying on a display. Thus, the client of the video hosting service functions as both the transmission apparatus PROD_A and the reception apparatus PROD_B.

Next, referring to FIG. 3, it will be described that the above-mentioned video coding apparatus 11 and the video decoding apparatus 31 can be utilized for recording and reconstruction of videos.

Figure 3:
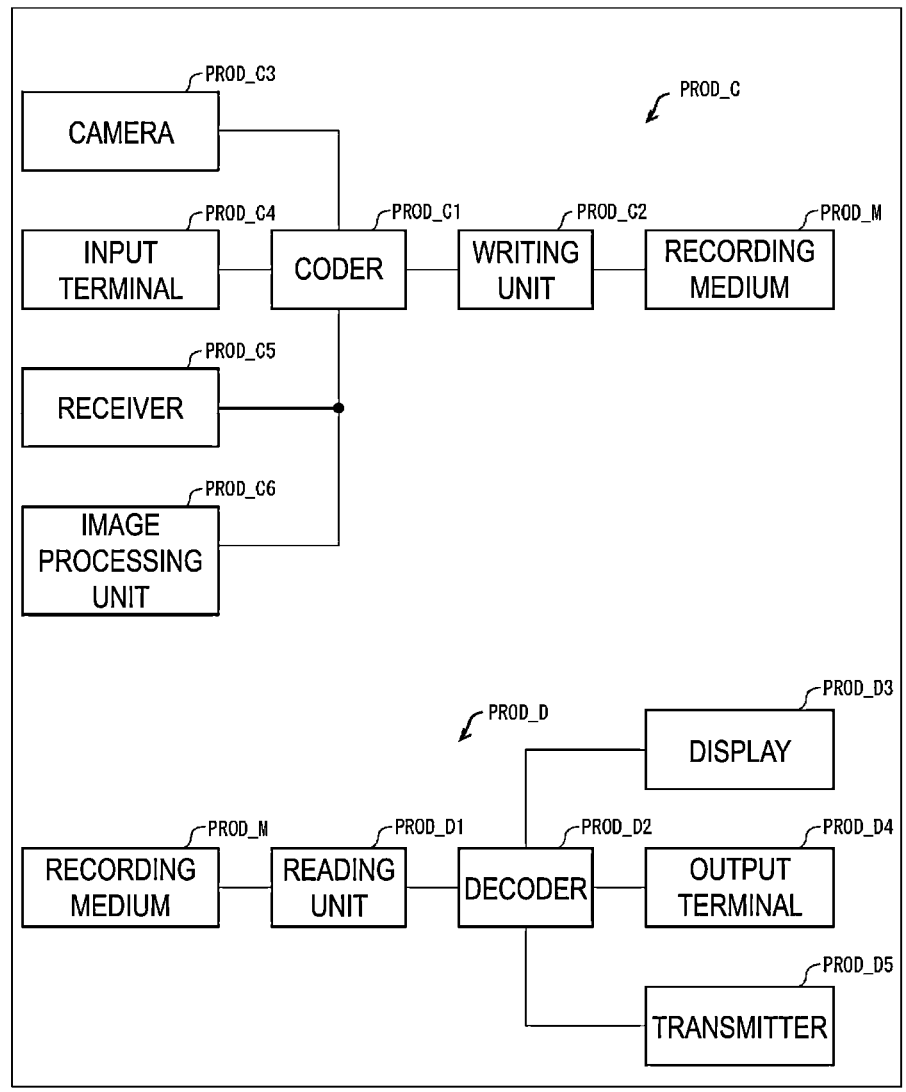
FIG. 3 is a diagram illustrating configurations of a recording apparatus equipped with the video coding apparatus and a reconstruction apparatus equipped with the video decoding apparatus according to the present embodiment. PROD_C illustrates the recording apparatus equipped with the video coding apparatus, and PROD_D illustrates the reconstruction apparatus equipped with the video decoding apparatus.

FIG. 3 illustrates a block diagram illustrating a configuration of a recording apparatus PROD_C installed with the above-mentioned video coding apparatus 11. As illustrated in FIG. 3, the recording apparatus PROD_C includes a coder PROD_C1 that obtains coded data by coding a video, and a writing unit PROD_C2 that writes the coded data obtained by the coder PROD_C1 in a recording medium PROD_M. The above-mentioned video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in the diagram, some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

FIG. 3 illustrates a block diagram illustrating a configuration of a reconstruction apparatus PROD_D installed with the above-mentioned video decoding apparatus 31. As illustrated in the diagram, the reconstruction apparatus PROD_D includes a reading unit PROD_D1 which reads coded data written in the recording medium PROD_M, and a decoder PROD_D2 which obtains a video by decoding the coded data read by the reading unit PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

The reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in the diagram, some of the constituents may be omitted.

Note that the transmitter PROD_D5 may transmit a video which is not coded or may transmit coded data coded in the coding scheme for transmission different from a coding scheme for recording. In the latter case, a coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each of the above-described apparatuses includes a CPU that performs a command of a program to implement each of functions, storage apparatuses (recording media) such as a Read Only Memory (ROM) that stores the program, a Random Access Memory (RAM) to which the program is loaded, and a memory that stores the program and various kinds of data, and the like. In addition, an objective of the embodiments of the present invention can be achieved by supplying, to each of the apparatuses, the recording medium that records, in a computer readable form, program codes of a control program (executable program, intermediate code program, source program) of each of the apparatuses that is software for realizing the above-described functions and by reading and executing, by the computer (or a CPU or an MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD: trade name)/CD Recordable (CD-R)/Blu-rayDisc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

Each of the apparatuses may be configured to be connectable to a communication network, and the program codes may be supplied through the communication network. The communication network may be any network as long as the network is capable of transmitting the program codes, and is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiment of the present invention can be also realized in the form of computer data signals embedded in a carrier wave such that the transmission of the program codes is embodied in electronic transmission.

The embodiment of the present invention is not limited to the above-described embodiment, and various modifications are possible within the scope of the claims. That is, an embodiment obtained by combining technical means modified appropriately within the scope of the claims is also included in the technical scope of the present invention.

INDUSTRIAL APPLICABILITY

The embodiment of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

CROSS-REFERENCE OF RELATED APPLICATION

The present application claims priority of JP 2020-209914, filed on Dec. 18, 2020, and all the contents thereof are included herein by the reference.

REFERENCE SIGNS LIST

31 Video decoding apparatus
301 Entropy decoder
302 Parameter decoder
3020 Header decoder
308 Prediction image generation unit
311 Inverse quantization and inverse transform processing unit
312 Addition unit
11 Video coding apparatus
101 Prediction image generation unit
102 Subtraction unit
103 Transform and quantization unit
104 Entropy coder
105 Inverse quantization and inverse transform processing unit (scaling unit)
107 Loop filter
110 Coding parameter determination unit
111 Parameter coder
1110 Header coder
1111 CT information coder
1112 CU coder (prediction mode coder)
1114 TU coder
311 Inverse quantization and inverse transform processing unit (scaling unit)
3111 Inverse quantization unit
3112 Inverse transform processing unit
31123 Inverse core transform processing unit

The invention claimed is:
1. An image decoding apparatus comprising:
a scaling circuit that derives a scaled transform coefficient by clipping a first value by a minimum value and a maximum value, wherein the minimum value and the maximum value are derived by using a first range value and the first value is derived by using (i) a product of a transform coefficient and a scaling parameter and (ii) a right-shift operation by a first shift value;
an inverse transform processing circuit that derives an intermediate coefficient obtained by (i) transforming the scaled transform coefficient and (ii) clipping by the minimum value and the maximum value and that derives a residual by transforming the intermediate coefficient and right-shifting by a second shift value; and a transport unit (TU) decoder that decodes a syntax element representing an absolute value of the transform coefficient, in which a suffix part of the absolute value is decoded by using a variable maxPreExtLen equal to 26 minus the first range value, wherein the first shift value and the second shift value are derived by using a value of a first bit-depth, the first range value is set to a minimum value of (i) a sum of a value of the first bit-depth and 6 and (ii) a constant value equal to 20, in a case that a value of an extension flag is true, and the extension flag specifies whether an extended range is used.

2. The image decoding apparatus according to claim 1, wherein in the case that the value of the extension flag is true, the first range value is set to the sum of the value of the first bit-depth and 6 in a range of 15 to the constant value.

3. The image decoding apparatus according to claim 1, wherein a binarization of the syntax element is constituted of a prefix code and a suffix code, and a length of an escape portion of the suffix code is set equal to the first range value.

4. An image encoding apparatus comprising:

a scaling circuit that derives a scaled transform coefficient by clipping a first value by a minimum value and a maximum value, wherein the minimum value and the maximum value are derived by using a first range value and the first value is derived by using (i) a product of a transform coefficient and a scaling parameter and (ii) a right-shift operation by a first shift value;

an inverse transform processing circuit that derives an intermediate coefficient obtained by (i) transforming the scaled transform coefficient and (ii) clipping by the minimum value and the maximum value and that derives a residual by transforming the intermediate coefficient and right-shifting by a second shift value; and a transport unit (TU) encoder that encodes a syntax element representing an absolute value of the transform coefficient, in which a suffix part of the absolute value is encoded by using a variable maxPreExtLen equal to 26 minus the first range value, wherein the first shift value and the second shift value are derived by using a value of a first bit-depth, the first range value is set to a minimum value of (i) a sum of a value of the first bit-depth and 6 and (ii) a constant value equal to 20, in a case that a value of an extension flag is true, and the extension flag specifies whether an extended range is used.

5. An image decoding method including:

deriving a scaled transform coefficient by clipping a first value by a minimum value and a maximum value, wherein the minimum value and the maximum value are derived by using a first range value and the first value is derived by using (i) a product of a transform coefficient and a scaling parameter and (ii) a right-shift operation by a first shift value;

deriving an intermediate coefficient obtained by (i) transforming the scaled transform coefficient and (ii) clipping by the minimum value and the maximum value;

decoding a syntax element representing an absolute value of the transform coefficient, in which a suffix part of the absolute value is decoded by using a variable maxPreExtLen equal to 26 minus the first range value; and deriving a residual by transforming the intermediate coefficient and right-shifting by a second shift value, wherein the first shift value and the second shift value are derived by using a value of a first bit-depth, the first range value is set to a minimum value of (i) a value of the first bit-depth and 6 and (ii) a constant value equal to 20, in a case that a value of an extension flag is true, and the extension flag specifies whether an extended range is used.

* * * * *